(12) United States Patent
Black et al.

(10) Patent No.: US 10,899,033 B2
(45) Date of Patent: Jan. 26, 2021

(54) TOOL AND METHOD FOR SEPARATING AND PICKING CUT PIECES OF FLEXIBLE MATERIALS

(71) Applicant: ARM AUTOMATION, INC., Austin, TX (US)

(72) Inventors: Derek D. Black, Austin, TX (US); Nathan R. Woodward, Austin, TX (US); Damian J. Hendriks, Dripping Springs, TX (US); Joseph W. Geisinger, Austin, TX (US); Stephen G. Grupinski, Austin, TX (US)

(73) Assignee: Arm Automation, Inc., Austin, TX (US)

( * ) Notice: Subject to any disclaimer, the term of this patent is extended or adjusted under 35 U.S.C. 154(b) by 28 days.

(21) Appl. No.: 16/222,955

(22) Filed: Dec. 17, 2018

(65) Prior Publication Data

US 2019/0118401 A1 Apr. 25, 2019

Related U.S. Application Data

(63) Continuation-in-part of application No. 15/371,118, filed on Dec. 6, 2016.

(51) Int. Cl.
*B26D 7/18* (2006.01)
*B25J 15/06* (2006.01)
(Continued)

(52) U.S. Cl.
CPC ........ *B26D 7/1863* (2013.01); *B25J 15/0014* (2013.01); *B25J 15/0038* (2013.01);
(Continued)

(58) Field of Classification Search
CPC .... B26D 7/1863; B26D 5/005; B65H 29/243; B65H 2404/152; B65H 2406/331; B65H 2701/174; B65H 2701/131; B65H 5/226; B65H 23/4422; B65H 2406/3632; B65H 2404/1531; B65H 2301/4472; B65H 3/10; B65H 5/023; B65H 301/42324; B65H 3/46; B65G 61/00; B65G 2701/175; B25J 15/0616
USPC ....... 83/13, 152; 156/265, 230, 250; 271/96, 271/104, 106, 31.1, 94, 149, 108, 5, 271/11–15, 121, 112
See application file for complete search history.

(56) References Cited

U.S. PATENT DOCUMENTS 3,271,024 A 9/1966 May
3,584,866 A 6/1971 Ross
(Continued)

OTHER PUBLICATIONS

Form PCT/ISA/210 PCT/ISA/210 and PCT/ISA/220 Patent Cooperation Treaty International Search Report; International Application No. PCT/US17/64118; dated Feb. 15, 2018; pp. 1-4.
(Continued)

*Primary Examiner* — Ghassem Alie
(74) *Attorney, Agent, or Firm* — Larson Newman, LLP

(57) ABSTRACT

The disclosure relates to a method and apparatus for uncut material detection while lifting from an automated cutting table select pieces of thin, flexible material. The apparatus comprises a structured energy source and a structured energy sensor. The structured energy can be used to detect undesired lifting of a peripheral portion of the flexible material resulting from the presence of uncut material.

20 Claims, 22 Drawing Sheets

(51) Int. Cl.
    *B26D 5/00*           (2006.01)
    *B65H 29/24*         (2006.01)
    *B65H 5/14*          (2006.01)
    *B65H 5/22*          (2006.01)
    *B25J 15/00*         (2006.01)

(52) U.S. Cl.
    CPC .......... *B25J 15/0616* (2013.01); *B26D 5/005* (2013.01); *B65H 5/14* (2013.01); *B65H 5/226* (2013.01); *B65H 29/243* (2013.01); *B65H 2301/4472* (2013.01); *B65H 2404/152* (2013.01); *B65H 2406/331* (2013.01); *B65H 2406/3632* (2013.01); *B65H 2701/131* (2013.01); *B65H 2701/174* (2013.01); *B65H 2701/175* (2013.01)

(56) References Cited

U.S. PATENT DOCUMENTS

| | | | |
|---|---|---|---|
| 4,345,752 A | 8/1982 | Nakamura et al. | |
| 4,739,982 A | 4/1988 | Hain | |
| 4,870,727 A | 10/1989 | Ribolla et al. | |
| 5,496,021 A | 3/1996 | Billio et al. | |
| 5,623,850 A | 4/1997 | Szczepaniak et al. | |
| 6,446,955 B1 | 9/2002 | Janatka et al. | |
| 6,773,006 B2 | 8/2004 | Andreyka et al. | |
| 7,273,142 B2 * | 9/2007 | Huis | B31D 5/0073 198/369.2 |
| 7,601,237 B2 | 10/2009 | Burgess et al. | |
| 9,364,967 B2 | 6/2016 | Fastert et al. | |
| 2004/0055521 A1 | 3/2004 | Katou | |
| 2004/0142062 A1 | 7/2004 | Herrera | |
| 2005/0029731 A1 | 2/2005 | Chang | |
| 2006/0037693 A1 | 2/2006 | Wade | |
| 2006/0261120 A1 | 11/2006 | Slyne | |
| 2008/0073866 A1 | 3/2008 | Santos Gomez | |
| 2009/0289143 A1 | 11/2009 | Tanaka et al. | |
| 2010/0154611 A1 * | 6/2010 | Lammlein, Jr. | B26D 3/003 83/78 |
| 2010/0206485 A1 * | 8/2010 | Kodera | B29C 63/024 156/358 |
| 2012/0227866 A1 | 9/2012 | Barker | |
| 2016/0065772 A1 * | 3/2016 | Lewis | H04N 1/00681 358/1.14 |
| 2017/0151097 A1 | 6/2017 | Schneider et al. | |
| 2017/0368706 A1 | 12/2017 | Zünd et al. | |
| 2018/0154539 A1 | 6/2018 | Black et al. | |

OTHER PUBLICATIONS

YouTube Video published Mar. 15, 2016 by AssysBullmerUK "Cutting machine for composites for automated composites production at Cytec/Solvay Centre," accessed on Nov. 28, 2017 from <<https://youtube/IERawuk—Mw>>; relevant information at 1:05/3:33 to 1:13/3:33 of video. 14 pages of screen shots attached.
PCT/US2019/066953, International Search Report dated Apr. 9, 2020, 7 pages.

* cited by examiner

TOOL AND METHOD FOR SEPARATING AND PICKING CUT PIECES OF FLEXIBLE MATERIALS

CROSS-REFERENCE TO RELATED APPLICATIONS

The present application is a continuation-in-part of co-pending U.S. patent application Ser. No. 15/371,118, entitled "TOOL AND METHOD FOR SEPARATING AND PICKING CUT PIECES OF FLEXIBLE MATERIALS" filed on Dec. 6, 2016, the entirety of which is herein incorporated by reference.

Related subject matter is contained in co-pending International Patent Application No. PCT/US2017/064118 entitled "TOOL AND METHOD FOR SEPARATING AND PICKING CUT PIECES OF FLEXIBLE MATERIALS," filed on Dec. 1, 2017, the entirety of which is hereby incorporated by reference.

BACKGROUND

Field of the Disclosure

The present disclosure relates to automated picking of pieces cut from flexible sheets of material and, in particular, to an improved method and apparatus for lifting select pieces of cut material from a flexible sheet positioned on a table.

Background of the Disclosure

The efficient removal of workpieces cut from flexible sheets of material has long been a challenge to manufacturers. Although human labor and intelligence provides flexibility in dealing with contingencies, manual picking is generally slow and inefficient, particularly in high-volume operations, and manual handling can also introduce damage, process errors, and related quality issues.

To address these issues, many manufacturers have turned to automated methods, such as robots, to selectively pick and handle various shaped pieces cut from sheets of material, and defined by cut lines. In order for robotic automation to selectively pick a specific piece of cut material from the surrounding sheet of material on the cutting table, some mechanism of selective coupling between a pick head and the specific workpiece must be provided. Various mechanisms for engaging a specific workpiece include individually controllable needle-and-hook type grippers and flat arrays of vacuum orifices. The use of needle-and-hook type grippers can have issues with engaging and releasing of material. The use of flat arrays requires the use of a large number of individually controllable vacuum orifices to ensure just a selected piece of material is engaged. An improved method and apparatus for automated picking thin materials would be beneficial.

BRIEF DESCRIPTION OF THE DRAWINGS

The present disclosure may be better understood, and its numerous features and advantages made apparent to those skilled in the art by referencing the accompanying drawings.

DETAILED DESCRIPTION OF THE DRAWINGS

The present disclosure describes an automated station having a pick head that provides for an improved approach to separate cut pieces from a flexible sheet of material placed upon a table. According to an embodiment, a cylinder of the pick head includes a lateral region of individually selectable vacuum orifices. The pick head is moved so that a portion of the individually selectable vacuum orifices are in contact with a leading edge of a cut piece of the flexible sheet. Similarly, a portion of the individually selectable vacuum orifices are in contact with a peripheral portion of the flexible sheet that is adjacent to the cut piece. A vacuum is enabled at those orifices that are in contact with a portion of the flexible sheet to hold a leading edge portion of the cut piece against the cylinder the cylinder. Conversely, no vacuum is enabled at those individually selectable vacuum orifices that are in contact with the peripheral portion of flexible sheet. Once the vacuum is applied to the desired individually selectable orifices, the cylinder is rolled over the flexible sheet while maintaining the vacuum so that the cut piece is wrapped onto the cylinder.

Figure 1:
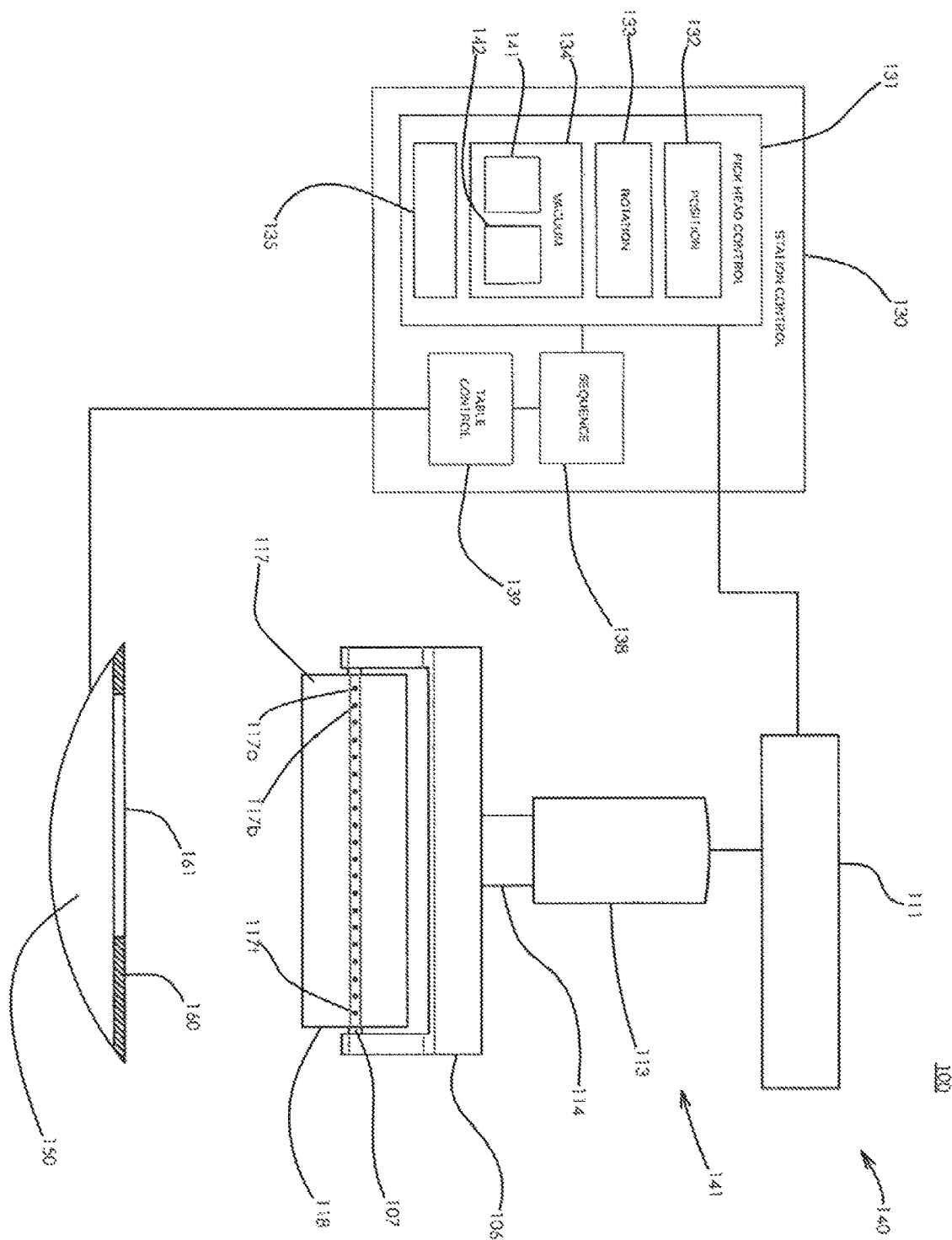
FIG. 1 is schematic and elevation view diagram illustrating an apparatus in accordance with an embodiment of the present disclosure.

FIG. 1 is a schematic and elevation view of an automated pick station 100 that includes a table 150, a pick head assembly 140, and a station controller 130. A flexible sheet 160 of material has been placed upon table 150. Individual pieces have been separated from the flexible sheet 160, and are also referred to herein as "cut pieces", "workpieces", and "select pieces". The table 150 can be a cutting table at which the cut pieces are separated from the flexible sheet 160 after a flexible sheet of uncut material has been positioned on the table 150. A specific cut piece 161 is illustrated in cross section.

According to an embodiment, the flexible sheet 160 can include an organic material, a non-organic material, and combinations thereof. The flexible sheet can include a plurality of layers that themselves can be sheets of different materials. The flexible sheet 160 can be made from a fibrous or non fibrous material. Fibrous materials can be woven or non-woven. A non-fibrous material can include a polymer, a plastic, the like, and combinations thereof. An example of a non-woven fibrous material is one in which fibers are arranged in overlapping curves, as is the case, for example, with spun-bonded polyolefin materials. Woven and non-woven materials can be placed on, or otherwise integrated with a sticky material, such as a resin. Different layers of a flexible sheet can perform different functions. For example, the flexible sheet can include a reinforcement layer, an adhesion layer, and the like. For purposes of description, it is presumed the flexible sheet 160 includes carbon-fiber material.

The pick head assembly 140 includes a positioner assembly 111 and a pick head 141 that includes a support column 113, a rotator 114, a yoke frame 106, and a cylinder 118. The pick head 141 is connected to the positioner assembly 111, which can move the pick head in lateral, transverse, and vertical directions. The term "lateral direction" as used herein in reference to the pick head 141 is intended to mean the direction as defined by the axis of the cylinder 118, the term "transverse direction" as used herein refers to the direction orthogonal to the lateral direction that is also parallel to the surface of table 150, and the term "vertical direction" as used herein refers to the direction orthogonal to the lateral and transverse directions, and is thus orthogonal to the surface of table 150.

The support column 113 is connected to a rotator 114 that can rotate along a vertical axis. A yoke frame 106 is also connected to the rotator 114, and can also be rotated about a vertically axis by the rotator 114. An axis bar 107 extends between arms of the yoke frame 106 to support the cylinder 118. The cylinder 118 rotates about the axis bar 107 and includes a cylindrical surface. The cylindrical surface includes a lateral region that includes a plurality of orifices 117, including orifices 117A-117T. The lateral region can be referred to a band of orifices, and has a length dimension that extends laterally across the cylindrical surface, e.g., in the direction of the axis bar, and a width dimension, e.g., a peripheral dimension, that wraps around the cylindrical surface in a direction orthogonal to the lateral direction. Each one of the orifices 117A-117T is an individually controlled vacuum orifice. Thus, a negative pressure can be applied at each orifice of the plurality of vacuum orifices 117A-117T independent of each other of the vacuum orifices. A negative pressure is also referred to herein as a vacuum. The term "vacuum" as used herein is intended to be a generic term for a negative pressure consistent with the application described herein.

Operation of pick head assembly 140 and the table 150 can be controlled by station control circuitry 130, also reference to as static controller 13, to which they are connected. The station controller 130 can be an application specific circuit, a general purpose circuit, or a combination thereof. According to an embodiment, the station controller includes a general purpose instruction-based data processor, and memory circuitry that stores specific instructions to implement some or all of the operations described herein. The station controller 130 includes pick head control circuitry 131, table control circuitry 139, and sequencing circuitry 138. Each one of the various circuits includes one or more outputs that are connected to corresponding inputs of the pick head assembly 110 and the positioned assembly that moves the pick head. The pick head control circuitry 131 includes position circuitry 132, rotation circuitry 133, vacuum circuitry 134, and other circuitry 135. Each one of above referenced circuits of the station controller 130 can itself include a plurality of circuits that implement specific functions. For example, the vacuum control can include circuits 146 and 147 as will be discussed in greater detail herein.

During operation, the station control circuitry 130 manipulates the pick head assembly 140 to remove cut pieces from the flexible sheet 160. Operation of the pick station 100 and its various components will be better understood in reference to the flow diagram of FIG. 2, which represents a generalized control sequence implemented by the station control circuitry 130, and accompanying FIGS. 3-12.

Figure 2:
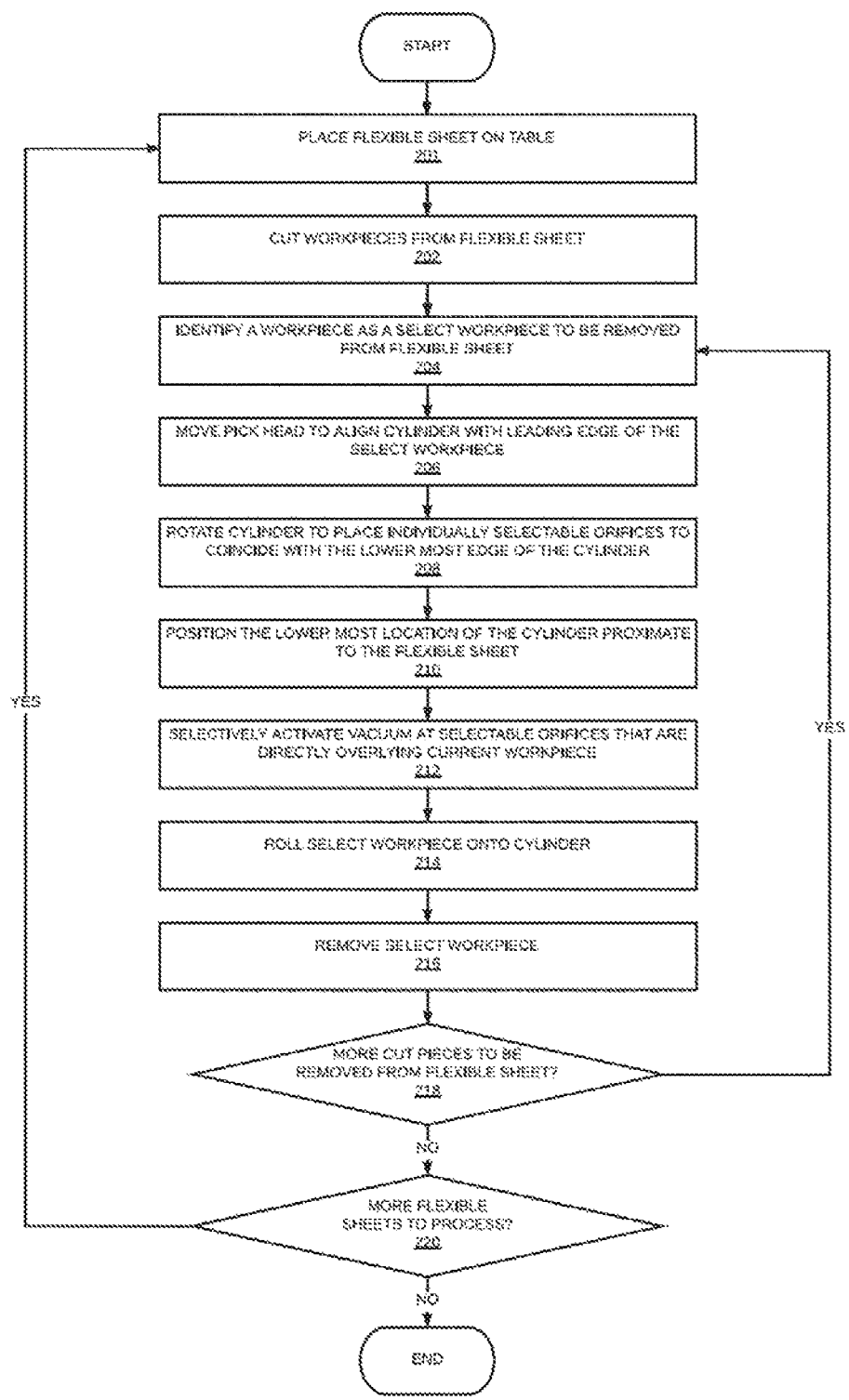
FIG. 2 is a flow diagram of a method in accordance with an embodiment of the present disclosure.

At block 201 of FIG. 2, the sequencing circuitry 138 enables operation of the table control circuitry 139 to place flexible sheet 160 on the table 150. In response, the table control circuitry 139 generates various control signals at its outputs to control placement of the flexible sheet 160 upon the table 150. For example, table control circuitry 139 can generate control signals at its outputs to position the flexible sheet 160 upon the table 150, as illustrated at FIG. 2. According to an embodiment, the control signals generated by the table control circuitry 139 can control mechanisms (not shown) that advance the flexible sheet 160 across the table from a bolt (not shown). For example, a roller attached to a used portion of flexible sheet 160 can be rotated by a motor to wrap a used portion of sheet 160 thereon, while simultaneously advancing a new flexible sheet from a bolt onto the table. According to an embodiment, the flexible sheet 160 is secured in place on the table by its ends, thereby preventing the flexible sheet 160 from being completely lifted off of the table 150. For example, the signals from table control circuitry 139 can cause the rollers holding the bolt and the used flexible sheets to be locked into place. In another embodiment, it is not necessary for the entire sheet of material to be positively secured against the table 150. Similarly, the sheet can be positioned manually.

Figure 3:
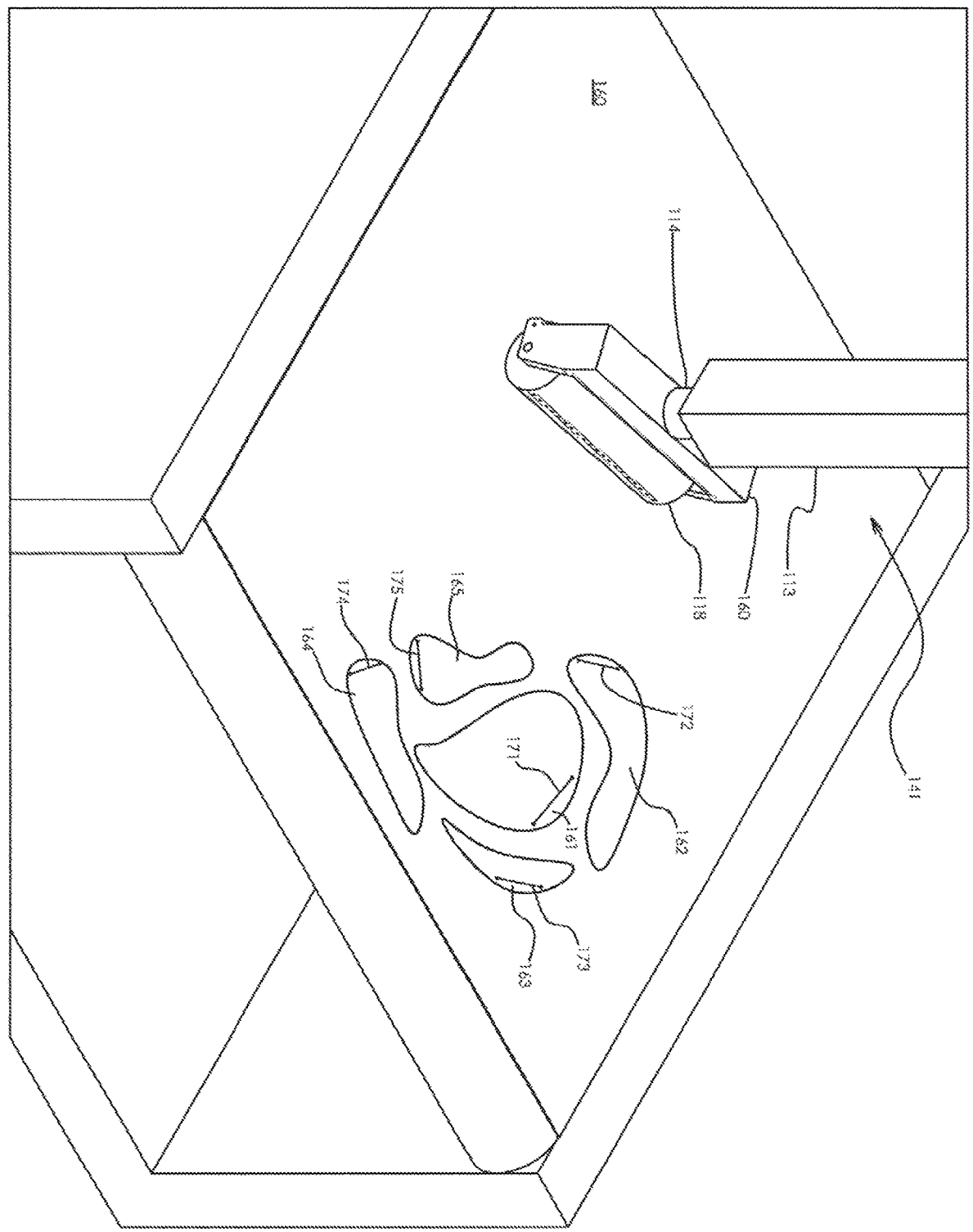
FIG. 3 is perspective view diagram that illustrates the pick head assembly of FIG. 1 at a particular location.

At block 202, the sequencing circuitry 138 enables the table control circuitry 139 to generate various control signals at its outputs to control a cutting apparatus (not shown) that cuts the individual workpieces to separate them from the flexible sheet 160, including cut pieces 161-165 as illustrated at FIG. 3. The term workpiece, cut piece, or select piece, as used herein, is intended to refer a portion of the flexible sheet 160 that has been fully or partially separated from the flexible sheet 160, so that it can be removed from the flexible sheet 160 using the pick head assembly as described herein. Also, the manner in which a cut piece can be separated from the flexible sheet 160 can vary. For example, a cut piece can be separated from the flexible sheet 160 by a tool having a sharp edge, a hot edge, a laser, the like, and combination thereof.

At block 204, the sequencing circuitry 138 enables circuitry to determine a next cut piece to be removed from the flexible sheet 160. According to an embodiment, the cut pieces can be identified by entries of a table, a linked list, and the like. For example, each entry of a list can reside at a storage location, and corresponds to a specific cut piece. The list can be a sequential list, wherein a pointer can be maintained that indicates a currently identified workpiece, referred to as a select workpiece or a current workpiece. A next cut piece can be identified by advancing to a next entry of the sequential list. In another embodiment, each entry can include pointer information that indicates where information for a next workpiece resides.

Each entry of such a list corresponding to a cut piece can include information that defines a leading edge location and length of the cut piece. The location of the leading edge can be identified by two endpoints of a line, a vector, and the like. For example, referring to FIG. 4, the leading edge of cut piece 161 can be identified by providing the table coordinates of point 166 and point 167 to define the line 171. The entry can also include information that indicates a direction orthogonal to its corresponding leading edge, e.g., line 171, that indicates to which side of line 171 the cut piece 161 resides. The entry can also include an indication of the length of the select piece 171 in an orthogonal direction relative the leading edge 171. This direction and length information can be used to determine a direction and distance to move the cylinder 118 when removing a cut piece. The identified leading edge of each workpiece 161-165 can be independently identified by its entry information. Thus, the orientation of each workpiece's leading edge can be independent of the orientation of each of the other leading edges. Thus, the leading edge 171 can be the same or different as some or all of the other workpieces' leading edges 172-175 indicated in FIG. 3. By way of illustration, it is presumed that workpiece 161 has been identified by block 204, and is, therefore, the current workpiece.

At block 206, the sequencing circuitry 138 enables the position control circuitry 132 to generate various control signals at its outputs that are provided to the positioning assembly 111 that moves the pick head 141 and rotator 114 to a location overlying the leading edge information of the current workpiece. For example, in FIG. 4 the cylinder 118 has been moved from its previous position away from select workpiece 161, as illustrated at FIG. 3, to a current position based upon the information that defines leading edge 171. In an embodiment, the motion control circuitry 139 moves the pick head 141 and rotator 114 so that a lateral edge of cylinder 118 that is closest the table 150 is parallel to and directly overlying the line corresponding to the leading edge of the select workpiece. For ease of discussion, the term "lower-most edge" as it refers to cylinder 118 is intended to mean a lateral edge of cylinder 118 that is closest the table 150.

Figure 4:
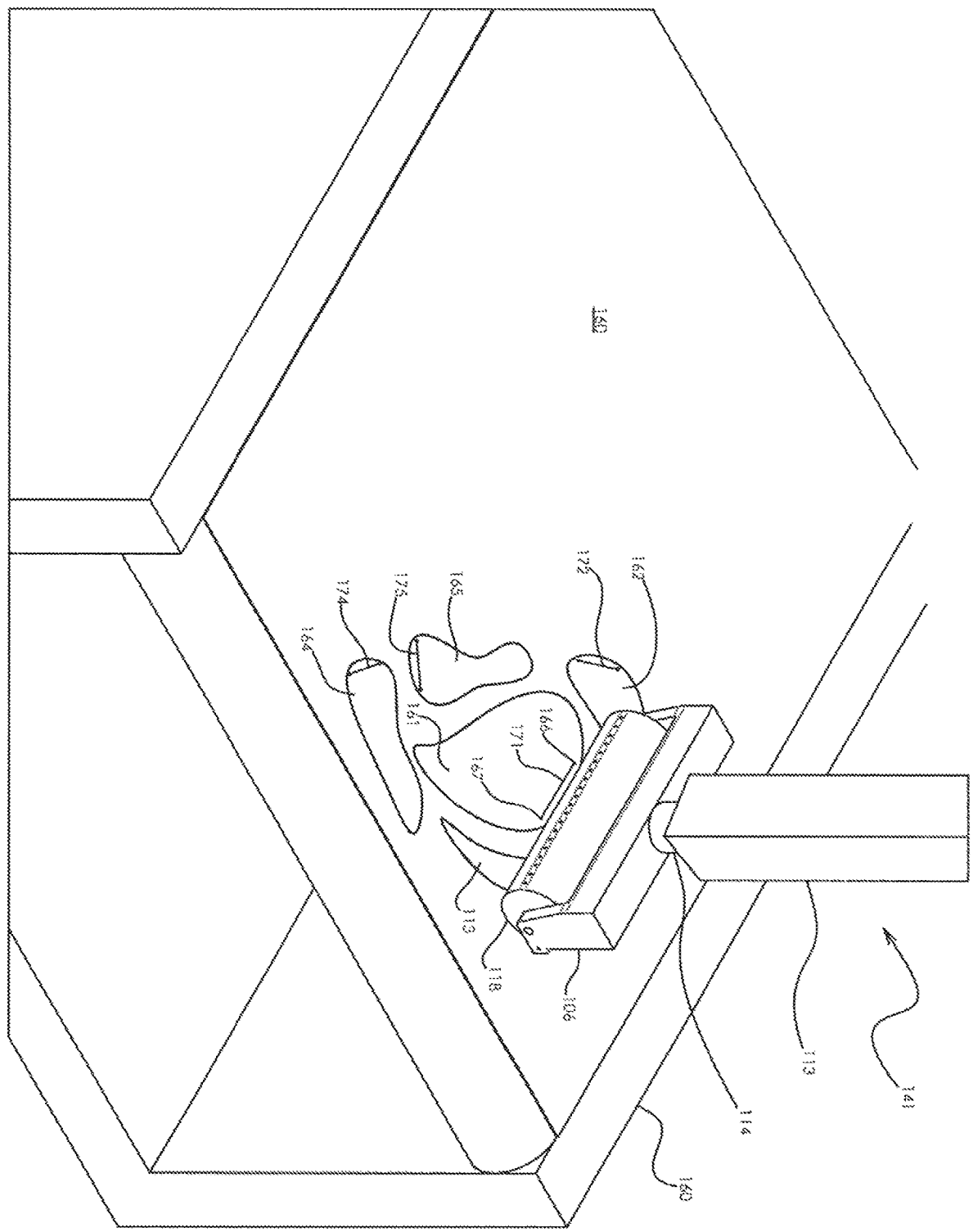
FIG. 4 is perspective view diagram that illustrates the pick head assembly of FIG. 3 at a different location.
Figure 5:
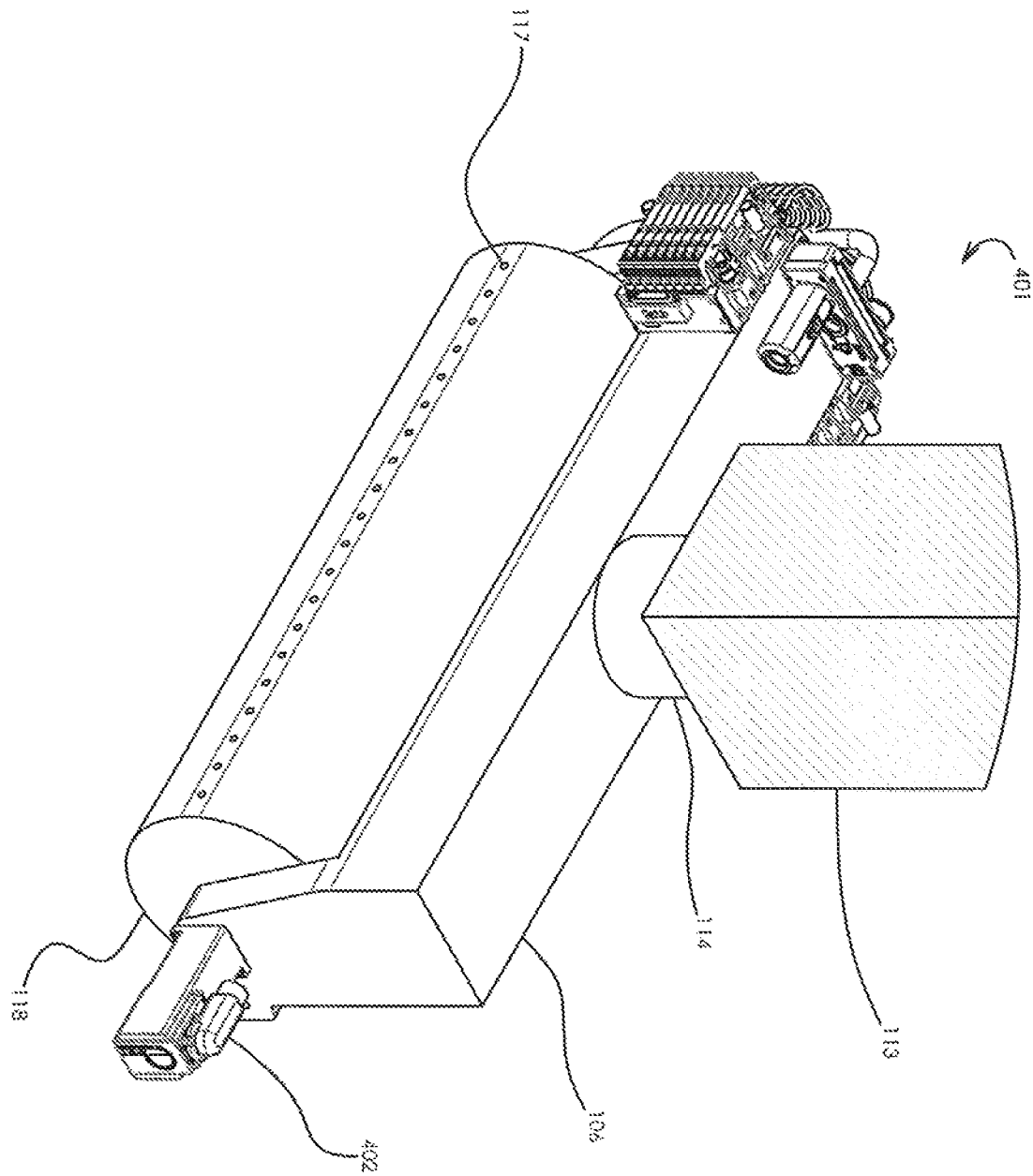
FIG. 5 is a close-up view of a portion of a pick head assembly of FIG. 4, in accordance with a specific embodiment.

FIG. 5 illustrates a more detailed view of a specific embodiment of a portion of the pick head 141 of FIG. 4. Specifically, FIG. 5 illustrates that the lateral region that includes orifices 117 does not yet coincide with the lower-most edge of the cylinder 118, but instead coincides with a leading edge of cylinder 118. FIG. 5 further illustrates additional detail of the pick head 110, including a vacuum actuator 401, and motor 402. Vacuum actuator 401 includes input terminals (not shown) that are connected to outputs of the vacuum control circuitry 133. According to an embodiment, the vacuum actuator 401 can include a control mechanism for each one of the individually selectable orifices 117A-117T, such as a separate solenoid, which can be activated, e.g., enabled, by signals generated by the vacuum control circuitry 134 to apply a vacuum at its corresponding orifice. The motor 402 includes input terminals (not shown) that are connected to outputs of the rotation control circuitry 133 to rotate the cylinder 118 to a desired orientation. This can be accomplished by controlling the rotator 114 while the cylinder 118 is not in contact with sheet 160, or by controlling the positioner assembly while the cylinder 118 is in contact with flexible sheet 160. The positioning of cylinder 118 over the select workpiece will be described in greater detail in reference to FIG. 6, below.

Figure 6:
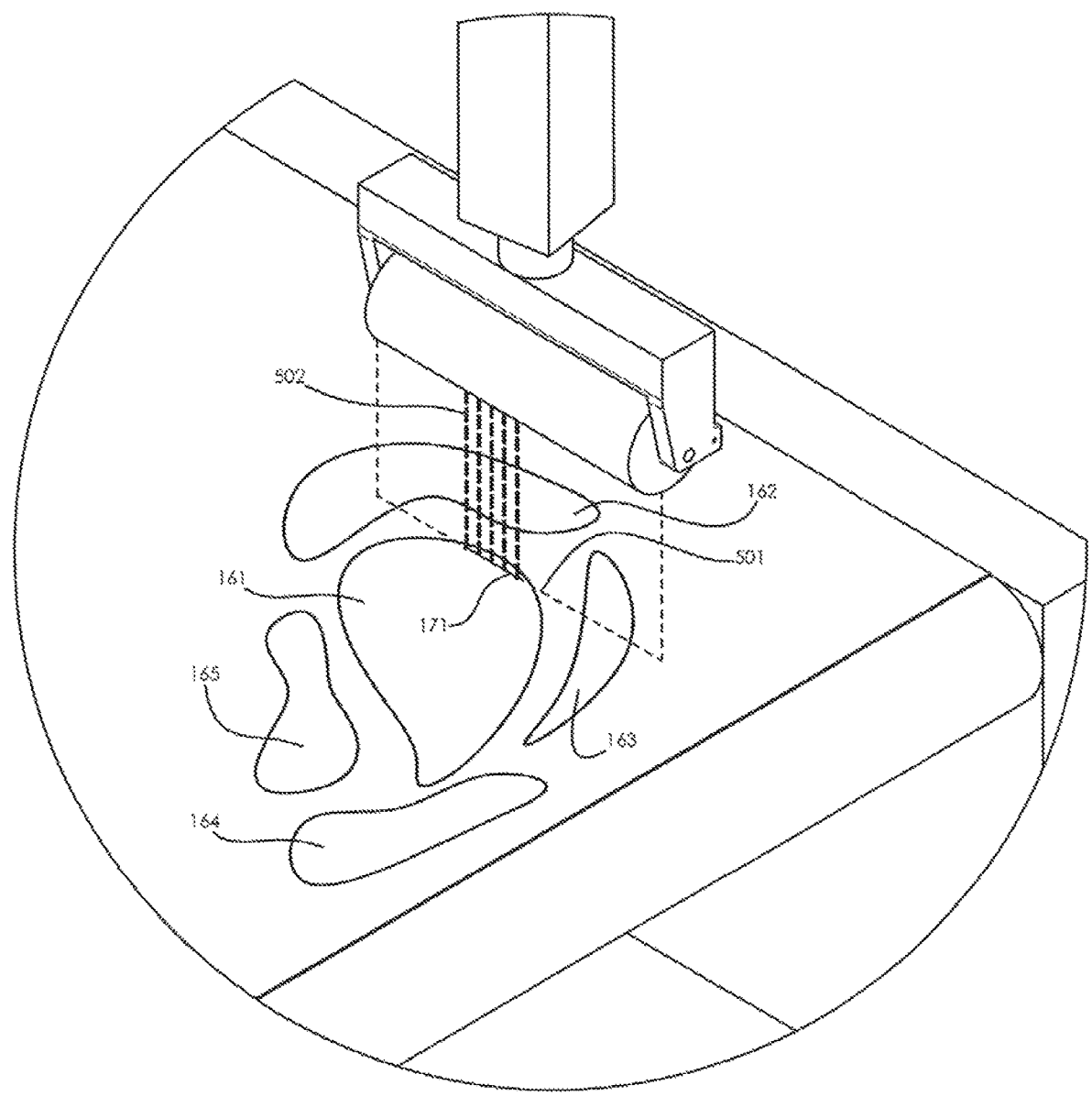
FIG. 6 is a perspective view diagram that illustrates a cylinder of the pick head assembly of FIG. 4 at a different orientation.

At block 208 (FIG. 2), the sequencing circuitry 138 enables the rotation control circuitry 139 to generate various control signals at its outputs that are provided to the motor 402 to rotate the cylinder 118 so that the orifices 117 are positioned at the lower-most location of the cylinder 118. FIG. 6 illustrates the pick head 100 at the same location as FIG. 4 after the cylinder 118 has been rotated to orient the orifices 117 at a lower-most position of cylinder 118. FIG. 5 illustrates a line 501 that is defined by an imaginary radial projection from the orifices 117A-117T onto the flexible sheet 160. The line 501 is coincident with the leading edge 171 of select workpiece 161. A portion of the orifices 117A-117T directly overlies the leading edge of the select workpiece 161.

At block 210 (FIG. 2), the sequencing circuitry 138 enables the position control circuitry 132 to generate various control signals at its outputs that cause the positioning assembly to lower the cylinder 118 to place the lower-most edge of the cylinder 118, which includes the orifices 117, in contact with, or close proximity to, the flexible sheet 160 to allow communication between vacuum chambers connected to the orifices 117 and the flexible sheet 160. For ease of discussion, it is presumed that the lower-most location of the cylinder 118 is in contact with the flexible sheet 160.

At block 212, the sequencing circuitry 138 enables selective control circuitry 146 of the vacuum control circuitry 132 to generate various control signals at its outputs that are provided to the vacuum actuator 402 to enable a vacuum at a subset of the orifices 117. The subset of orifices at which the vacuum is to be applied can be determined by the information defining the leading edge 171 of select workpiece 161. Conversely, the vacuum control circuitry 132 can also be said to generate control signals to disable a vacuum at the orifices 117 that are not part of the subset of orifices. For example, the vacuum control circuitry 132 can ensure that those orifices that do not directly overly the select workpiece 161 are disabled, e.g., no vacuum is present. Referring to FIG. 6, the five dashed lines 502 correspond to radial projections from a subset of five orifices of orifices 117 that directly overly the leading edge 171. This subset of orifices is also referred to herein by reference number 502, and is presumed to include orifices 117G-117K. As a result, the portion of the select workpiece 161 over which the subset of orifices 502 resides is in communication with the vacuum chambers of the orifices 502.

Figure 7:
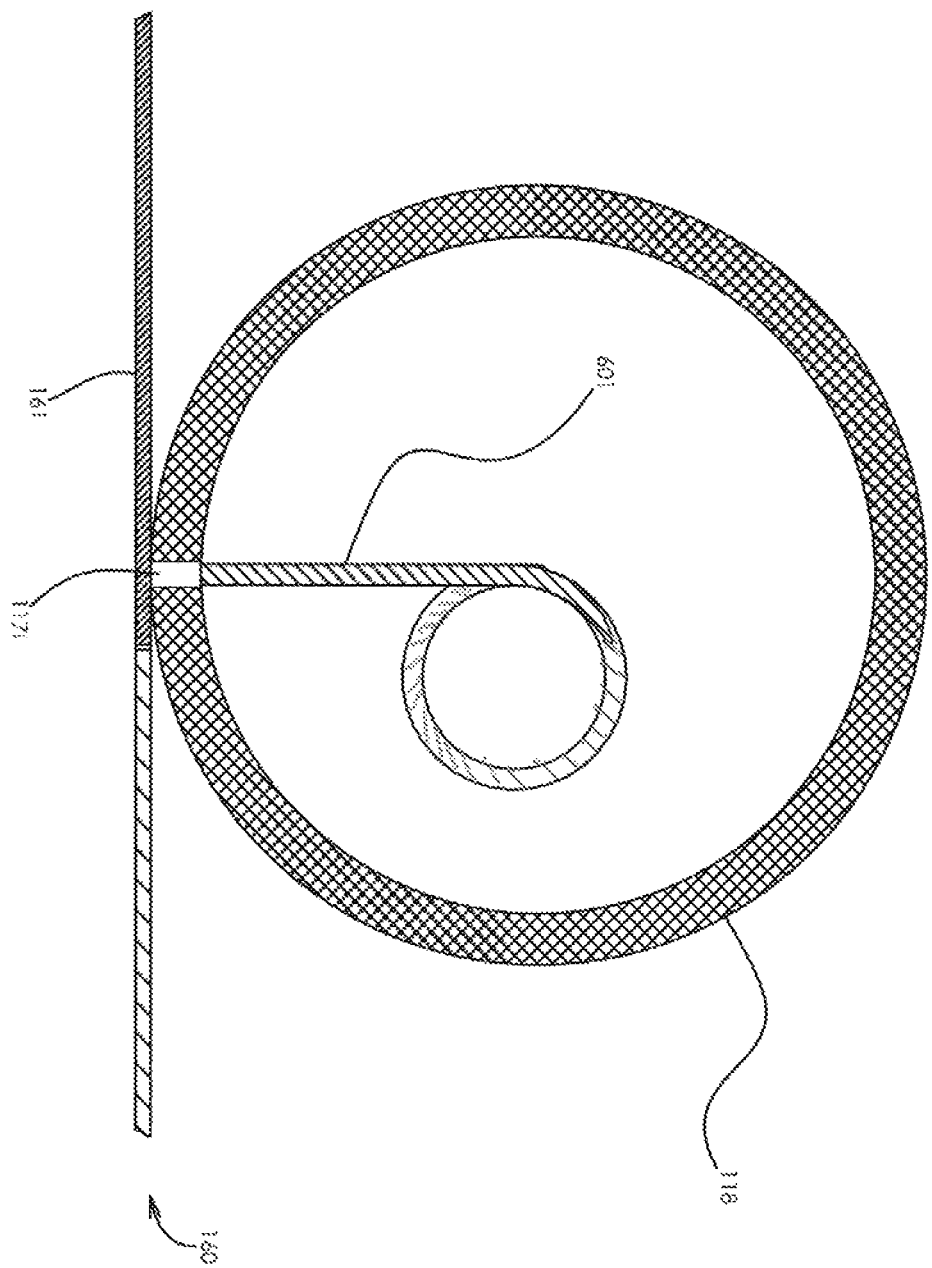
FIG. 7 is a cross-sectional view diagram illustrating an orifice of a cylinder of a pick head engaged with a cut piece in accordance with an embodiment of the present disclosure.

FIG. 7 illustrates a cross sectional view of cylinder 118 in contact with select workpiece 161. The view further illustrates a representative orifice 117I of the plurality of orifices 117I that is a member of the subset of orifices 502, a vacuum tube 601 that can be connected to a corresponding solenoid controlled by the vacuum actuator 402 to either enable or disable a vacuum at a vacuum chamber defined by vacuum tube 601. The vacuum tube 601 is cross-hatched in FIG. 7 to indicate a vacuum is being maintained within its vacuum chamber. It will be appreciated that station 100 is configured to apply a vacuum, e.g., a negative pressure, to the vacuum chamber that is sufficient to engage the select workpiece for the purposes described herein. Also illustrated at FIG. 7 are tangential projection lines 791 and 792. Tangential projection line 791 is a line tangent to a trailing-most edge 781 of the cylinder 118 in the vertical direction. Tangential projection line 792 is tangent to a leading-most edge 781 of the cylinder 118. The term "trailing-most edge" as used herein in the context of the cylinder 118 is intended to refer to the edge of cylinder 118 that is furthest behind the axis of cylinder 118 as the cylinder advances. Thus, as illustrated, because the cylinder 118 will advance from right to left when removing the cut piece 161, the trailing edge of the cylinder is the right-most edge 781. Conversely, the edge that is in front of the axis as the cylinder advances is referred to herein as the advancing-most edge, and represents the edge of cylinder 118 that is furthest in front of the cylinder 118. The term "under the trailing portion of the cylinder" is intended to refer to the space below the cylinder 118, to the left of tangential line 791, and to the right of orifice 117I. Similarly, the term "under the leading edge of the cylinder" is intended to refer to the space below the cylinder 118, to the right of tangential line 792, and to the left of orifice 117I.

Figure 8:
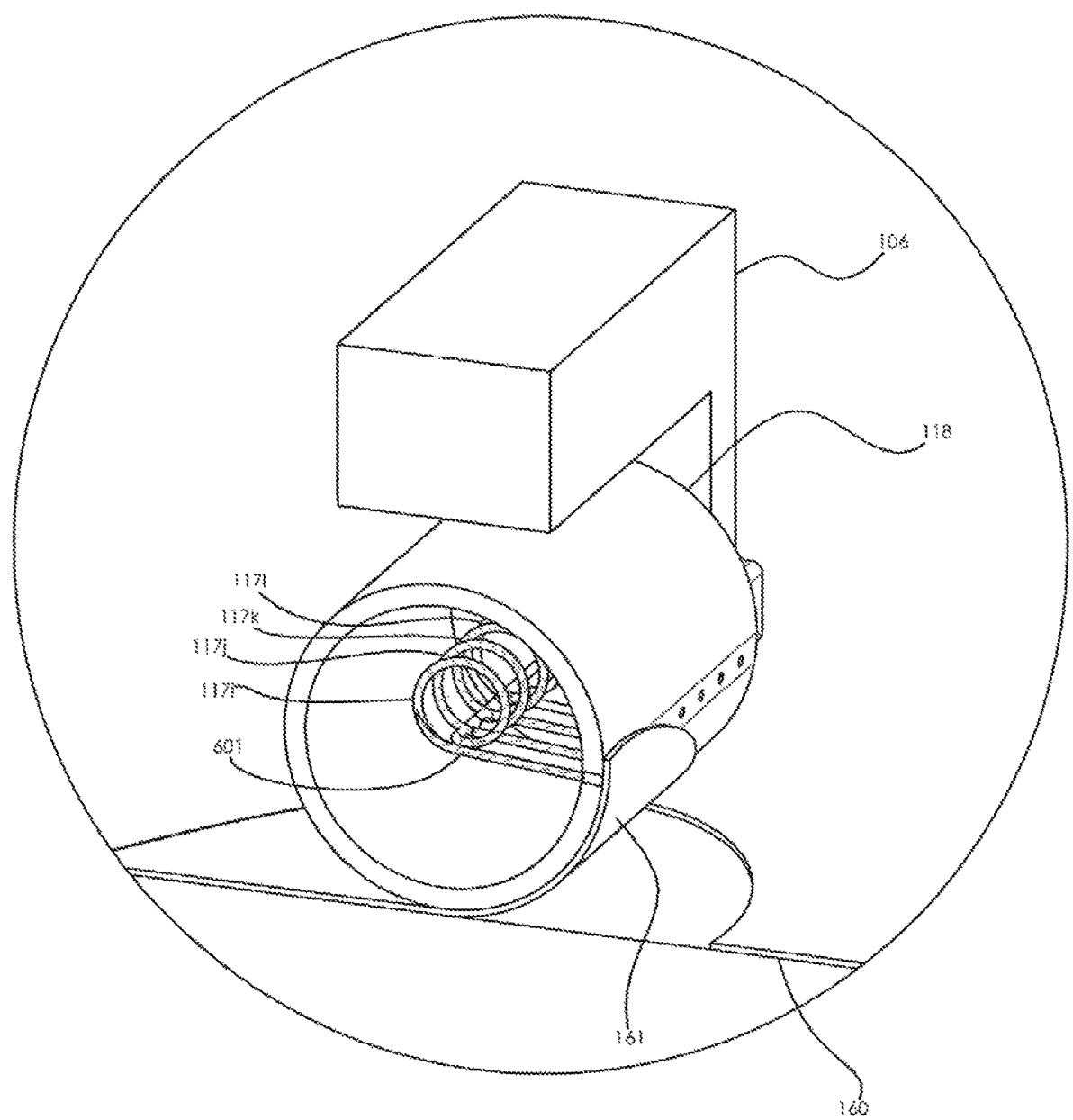
FIG. 8 is a perspective view diagram of a pick head in accordance with the present disclosure, as it rolls a cut piece onto a cylindrical surface.

At block 214, the sequencing circuitry 138 enables the position control circuitry 132 to generate various control signals at its outputs to move the cylinder 118 along the flexible sheet 160 in a direction orthogonal to the leading edge. The orthogonal direction can be determined by information corresponding to the select workpiece 161. Because the leading edge of the select piece is in communication with the enabled vacuum chambers, and because portions of the flexible sheet 160 adjacent to the select piece are not in positive communication with any orifices having enabled vacuum chambers, the select piece can be rolled onto the cylinder 118 as it advances across the flexible sheet 160. FIG. 8 illustrates a perspective view of the cylinder 118 as the select workpiece 161 is being rolled onto the cylinder 118 from the flexible sheet 160. Vacuum tubes for orifices 117I-117L are specifically illustrated. Orifices 117I-117K are cross-hatched in FIG. 8 to indicate that a vacuum is being enabled at their corresponding vacuum chambers. Orifice 117L is not cross-hatched in FIG. 8 to indicate a vacuum is disabled at its corresponding vacuum chamber. The cylinder 118 continues to advance until the select workpiece 161 has been completely removed from the flexible sheet 160. In an embodiment, the cylinder 118 advances an amount based upon a length of the workpiece as stored with information corresponding to select workpiece 161.

At block 216 of FIG. 2, after the cut piece has been rolled out to the cylinder 118, and the sequencing circuitry 138 enables the position control circuitry 132 to generate various control signals at its outputs to lift and move the cylinder 118 while the select workpiece 161 remains rolled onto the cylinder 118 to a location at which the select workpiece is to be placed, e.g., removed from the cylinder 118. Placement of the workpiece, such as in a bin containing similar workpieces or on a stack of desired workpieces of the same or different shape, can be accomplished by moving the cylinder 118 over a placement surface. The cylinder/current workpiece combination can be removed without placing the current workpiece 161 in contact with a placement surface, e.g., by rotating the cylinder 118 using motor 402. Placement of the select workpiece can also be accomplished by placing the workpiece, while rolled onto the cylinder 118, in contact with a placement surface and advancing the cylinder so that the select workpiece is unrolled onto the surface. Disabling the selected orifices allows transfer of the cut piece At block 218, the sequencing circuitry 138 determines if there are more cut pieces that need to be removed from the flexible sheet 160. For example, are there other entries in a list. If so, the operation proceeds to block 204 where the next workpiece is identified as the select workpiece as previously described. Otherwise, the flow proceeds to block 220. At block 220 the sequencing circuitry 138 determines if there are more sheets to be processed. If so, the operation proceeds to block 201 and a next flexible sheet 160 is placed over the table 160 as previously described. Otherwise, the flow proceeds to block 222 and the flow is completed.

The cylinder configuration described herein having a lateral region of selectively controllable vacuum orifices can be advantageous over applications using planar arrays of vacuum orifices and planar arrays of needle-and-hooks connectors by virtue of providing a reduction in the number of costly selectively controlled coupling elements that are typically used with planar arrays. Furthermore, by virtue of using a curved surface to progressively lift and separate the select piece from the adjacent material, e.g., a peeling motion, instead of lifting an entire cut piece simultaneously, this proposed solution greatly reduces the overall forces required to separate materials along the cut lines and reduces the potential for unintended lifting of surrounding materials due to residual coupling or cohesion between the select piece and surrounding material.

Figure 9:
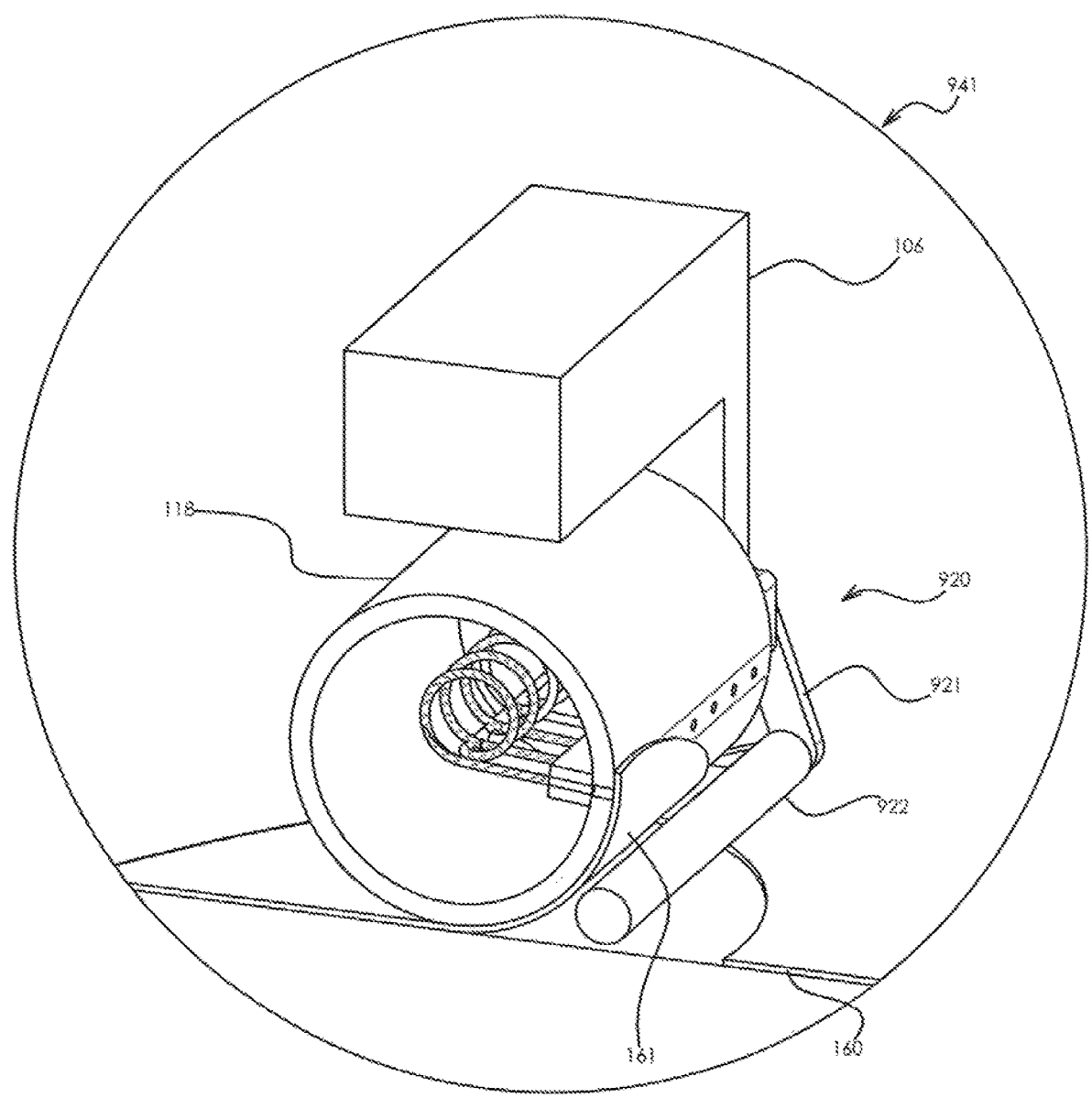
FIG. 9 is a cross-sectional elevation view diagram of a pick head that includes a separator rail in accordance with an embodiment of the present disclosure.

FIG. 9 illustrates a portion of a pick head 941 in accordance with an embodiment. Features of FIG. 9 that are similar in form and function of previously described features maintain the same reference numerals as the embodiment. In addition to features similar to those previously described, the pick head 941 includes a separator assembly 920. The illustrated portion of the separator assembly 920 includes an arm 921, and separator rail in the form of a roller 922. The arm 921 is attached to the yoke 106 and to the roller 922. The roller 922 can rotate about its axis and has a length that can be the same or different than that of the cylinder 118. The axis of the roller 922 is parallel to axis of the vacuum cylinder 118. In other embodiments, the separator assembly is not attached to the yoke 106, but is instead an apparatus separate from the pick head assembly, such as a separate robotic device, that can be positioned and controlled independently. Bar 921 can be in a fixed position relative the cylinder 118 so that the roller 922 resides at a transverse location behind the lower-most edge of cylinder 118. In an embodiment, some or all of the roller 922 can reside under the trailing edge of cylinder 118, and is, therefore, between the table 150 and the trailing edge of the cylinder 118. Thus, at least a portion of the roller 922 is directly below a portion of the cylinder 118. It will be appreciated that in FIG. 9, the region of the cylinder 118 that includes the orifices 117 is positioned at "the trailing edge" of the cylinder 118 as previously described. As such, the trailing edge of the cylinder 118 can extend beyond the trailing edge of the roller 922. The trailing edge of the roller 922 can extend beyond the trailing edge of the cylinder 118. The trailing edge of the roller 922 and the trailing edge of the cylinder 118 can be coincident in a vertical direction.

During removal of a select piece, the roller 922 is placed in contact with the non-selected portion of sheet 160 that is adjacent the cut piece 161 and is thus outside the extents of the leading edge of the selected cut ply. As the yoke 106 is initially advanced, such as by rolling the cylinder 118 across the surface of the select piece, the separator rail remains in contact with the un-selected adjacent material, thereby holding the remaining portions of the flexible sheet 160 against the surface of table 118 to prevent the adjacent material from being lifted away from the table along with the select piece.

As the pick head 910 is advanced to remove the select workpiece 161, the separator assembly 920 is simultaneously advanced to maintain a portion of the roller 922 between the select piece wrapped onto the cylinder 118 and the table 150, and another portion of the roller 922 being between adjacent portions of the flexible sheet 160 and the cylinder 118. In this manner, the adjacent portions of the flexible sheet 160 are held down, e.g., remain in contact with the table 150. Contact with the lower surface of the separator rail prevents the un-selected material of sheet 160 from being rolled onto the face of the cylinder. Additionally, the use of the separator rail can facilitate separation between the select workpiece 161 and the flexible sheet 160 in the event the select workpiece 161 remains attached to the flexible sheet 160 by a residual portion, either intentionally or unintentionally. The use of the separator rail can reduce damage to a select workpiece residually attached to adjacent portions of the flexible sheet 160 by preventing the flexible sheet from being lifted away from the table during the removal process, and by providing a low resistance to the flexible sheet 160 in the transverse direction as the roller advances. The use of a separator rail can also reduce movement and disorganization of the remaining flexible sheet that could otherwise make further automated picking difficult or impossible.

In an advantage of this embodiment, is that as the pick head assembly 910 and roller 922 are advanced, the lower surface of the roller 922 remains in contact with the upper surface of the surrounding material. This downward mechanical pressure serves to secure portions of the flexible material 160 that are not part of the cut piece against the table 150 while the leading edge of the roller 922 continuously forces separation of the material along a small portion of each cut line as it advances. This simultaneous positive separation and of material by the upper surface and lower surface of the Roller can act to forcibly separate the select piece from any residual material of the flexible sheet that may remain.

Figure 10:
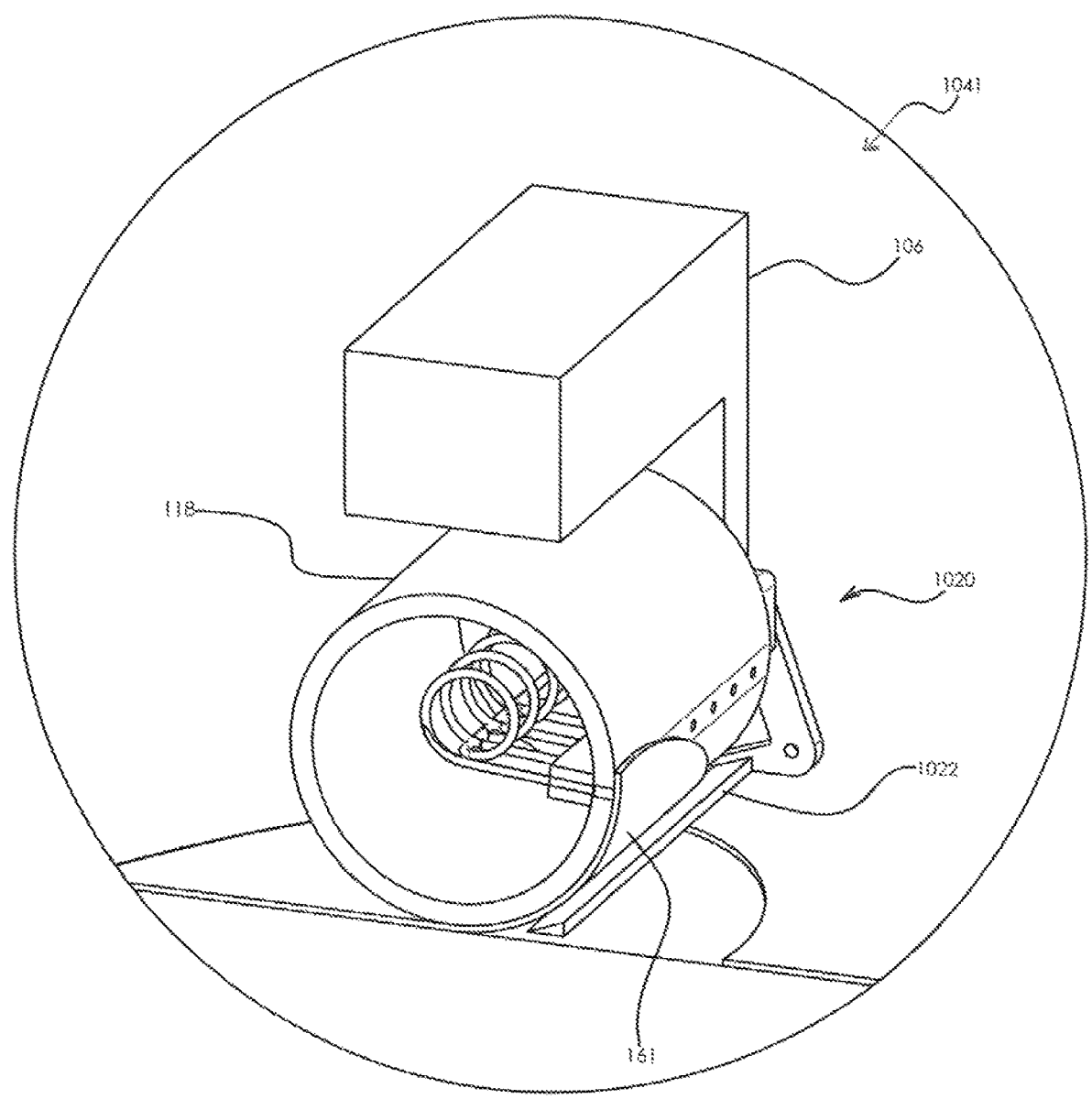
FIG. 10 is a cross-sectional elevation view diagram of a pick head that includes a separator rail in accordance with an embodiment of the present disclosure.

FIG. 10 illustrates a portion of a pick head 1010 that is similar to the pick head 910, except that the separator rail is in the form a fixed bar 1022, as opposed to a roller. It will be appreciated that the function of the fixed bar 1022 is similar to that of the roller 922 in that it holds peripheral portions of the flexible sheet 160 down as it slides across the flexible sheet 160 while the select workpiece 161 is being wrapped around the cylinder 118. The fixed bar 1022 includes a leading edge that is wedge shaped. The wedge shape can form a sharp edge, such as a blade edge. As such, the leading edge can sever small amounts of residual material connecting the cut piece 161 to the peripheral regions of the flexible sheet as the pick head assembly advances over the cut piece to further reduce the likelihood of undesirable tearing or misplacement of material. Additionally, the wedge-like action of the separator rail serves to overcome adhesion between the select piece and adjacent material as can be commonly encountered with dealing with sticky substances such as composite materials comprising reinforcement materials pre-impregnated with matrix materials. In another embodiment of the disclosure, the separator rail can be a bar that does not include a sharp edge. In another embodiment of the disclosure, the separator rail can include reciprocating portions, such like those found on hair trimming devices or clippers.

Figure 11:
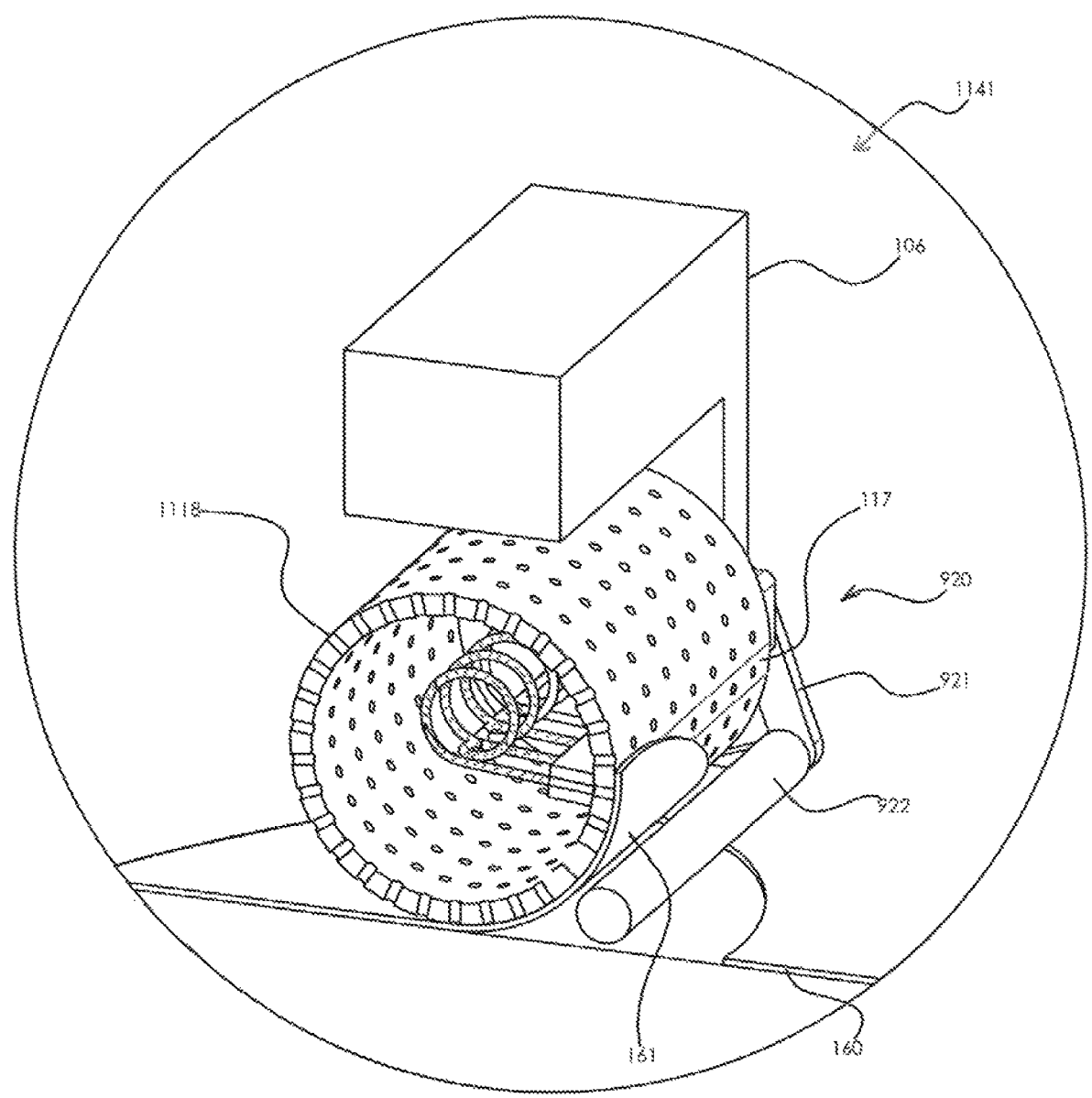
FIG. 11 is a cross-sectional elevation view diagram of a pick head that includes a cylinder that includes both individually controlled and commonly controlled suction orifices.

FIG. 11 illustrates an alternate embodiment of a pick head assembly 1110 that includes a cylinder 1118 having a set of common orifices extending around the circumference of the cylinder from one side of the individually selectable orifices 117 to the other side. Thus, the common orifices surround the individually selectable orifices 117. According to an embodiment, each one of the common orifices of FIG. 11 can share a common vacuum chamber that is defined by an inner cavity of the cylinder 1118. The vacuum chambers corresponding to the vacuum tubes of the individually selectable orifices remain individually controllable as they are not in communication with the common vacuum chamber.

During operation, a vacuum can be enabled at the common vacuum chamber by common vacuum control circuitry 142. Such an embodiment can be useful in combination with a separator rail to the extent that the force between the cut piece and the individually controlled vacuum orifices would otherwise be insufficient to maintain the select workpiece 161 in a fixed relation to the surface of the cylinder 1118 throughout the process of removing the select workpiece 161. Thus, in such a situation, the common vacuum orifices can be enabled to better hold the select piece against the cylinder 118 during the removal process. According to an embodiment, the vacuum to the common vacuum chamber can be enabled simultaneously with the individually selectable orifices 117. In another embodiment, the vacuum to the common vacuum chamber can be enabled after the individually selectable orifices 117, once the roller 922 has advanced to a position overlying the opening in the flexible sheet 160 made by lifting the leading edge of the select workpiece 161. In another embodiment, the vacuum to the common vacuum chamber can be enabled before the individually selectable orifices 117

It will be appreciated, that even though the common orifices are in communication with the portions of the flexible sheet 160 that are adjacent the select workpiece 161, these adjacent portions are held down by the separator rail to allow just the select workpiece 161 to be removed without lifting and disturbing the flexible sheet 160.

Figure 12:
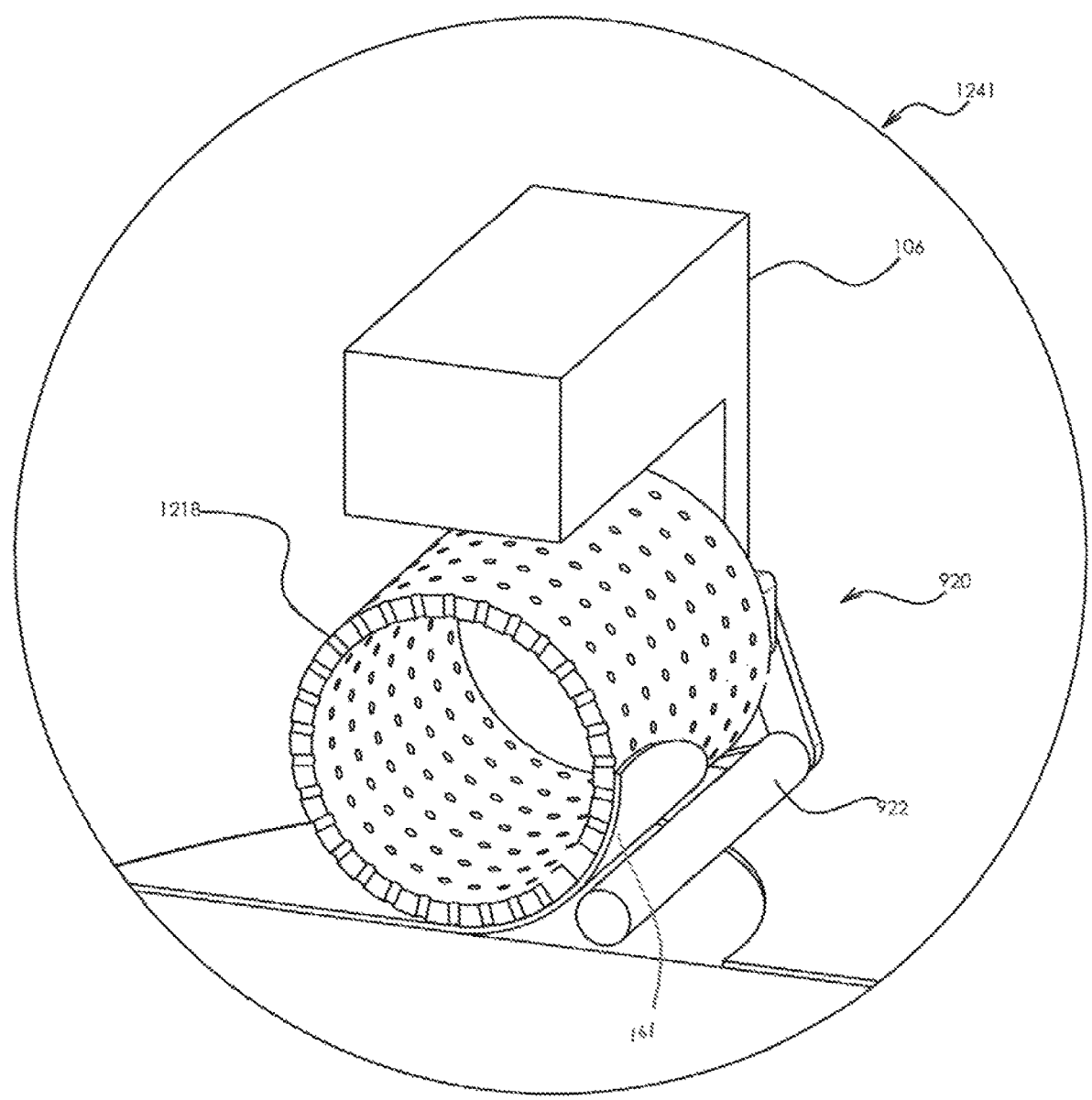
FIG. 12 is a cross-sectional elevation view diagram of a pick head that includes a cylinder that includes both individually controlled and commonly controlled suction orifices.

FIG. 12 illustrates an alternate embodiment of a pick head assembly that includes a cylinder 1218 having only common orifices extending around the perimeter of its cylindrical surface. Thus, in this embodiment, there are no individually selectable orifices 117. Each one of the common orifices of FIG. 12 are in communication with a common vacuum chamber that is defined by the inner cavity of the cylinder 1118. During operation, the cylinder 1218 is placed in contact with the leading edge of the cut piece. As a result, a portion of a lateral region of the cylinder 1218 is over the cut piece 161, while adjacent portions of the lateral region are over peripheral regions of the flexible sheet 160. A separator rail is placed in contact with a portion of the peripheral region that is near the leading edge. For example, the separator rail can be just behind the cut piece near its leading edge. As the cylinder 1218 is advanced, the separator rail maintains contact with portions of the flexible sheet that are peripheral to the cut piece to prevent them from being wrapped onto the cylinder. It will be appreciated that in this embodiment, the placement of the various cut pieces relative to each other need to be chosen so that the cylinder 1218 does not move onto a different cut piece while a select piece is being removed. Otherwise, the different cut piece will also be rolled onto the cylinder which can be undesirable. Note that the cylinder 1218 can be in initial contact with a cut piece that is not to be removed, so long as the separator bar 922 is also in initial contact with the cut piece that is not to be removed.

Figure 13:
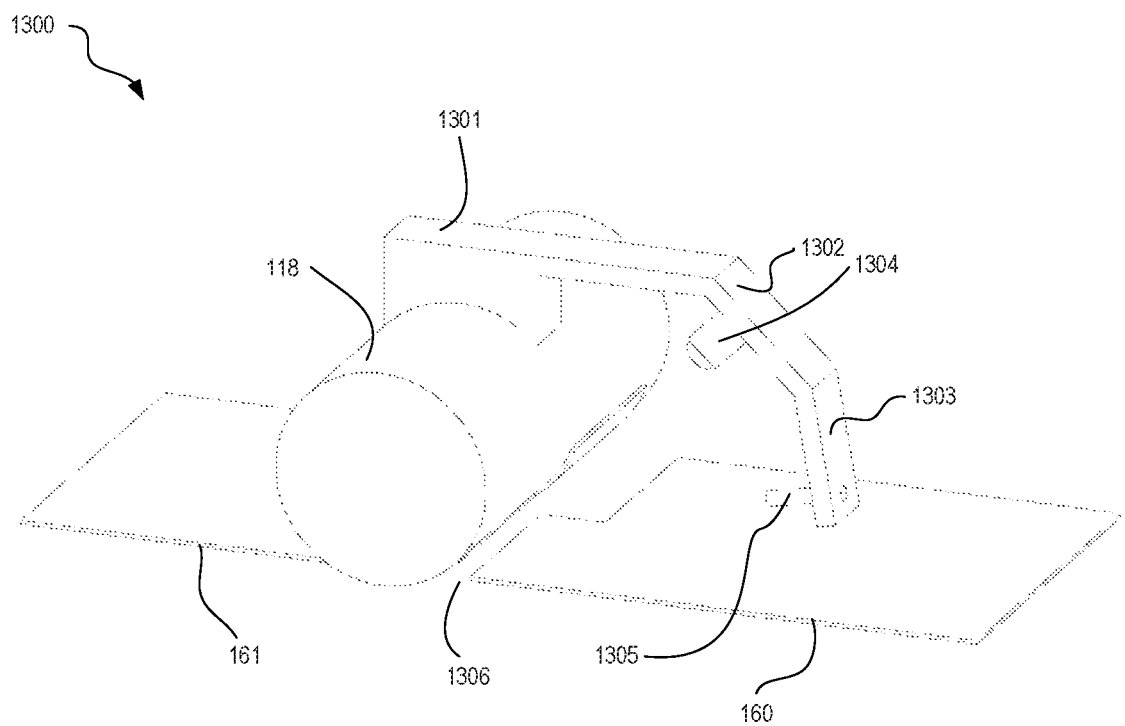
FIG. 13 is a perspective view diagram illustrating an apparatus for uncut material detection in accordance with at least one embodiment.

FIG. 13 is a perspective view diagram illustrating an apparatus for uncut material detection in accordance with at least one embodiment. Apparatus 1300 comprises cylinder 118, an uncut material detector bracket, structured energy sensor 1304, and structured energy source 1305. The uncut material detector bracket comprise an uncut material detector bracket portion 1301 connected to an uncut material detector bracket portion 1302 connected to an uncut material detector bracket portion 1303. Cylinder 118 lifts select workpiece 161 from flexible sheet 160, forming a gap 1306 between select workpiece 161 and a peripheral portion of flexible sheet 160. Gap 1306 is not bridged by any uncut material between select workpiece 161 and flexible sheet 160, showing select workpiece 161 to have been fully cut from flexible sheet 160.

Various types of structured energy sources and sensors may be selected, depending on the type of structured energy to be utilized. For example, optical sources and sensors may be used. As another example, acoustic sources and sensors may be used, such as sonic or ultrasonic sources and sensors. As another example, an electrostatic source and sensor may be used. As another example, a mechanical source and sensor may be used. Alternatively, embodiments may be practiced to specifically exclude the use of one or more types of sources and sensors. For example, a non-mechanical source and sensor may be used. As another example, a non-electrostatic source and sensor may be used. As a further example, a non-acoustic source and sensor may be used. As yet another example, a non-optical source and sensor may be used.

As an example of an optical structured energy source, a point-collimated light source may be used to project an essentially one-dimensional (e.g., length without significant width or height) beam of light. Examples of a point-collimated light source include a point-collimated laser and a point-collimated light-emitting diode (LED). Such a point-collimated light source may be useful, for example, for a through-beam embodiment. As another example of an optical structured energy source, a line-collimated light source may be used to project an essentially two-dimensional (e.g., length and width without significant height) beam of light. Examples of a line-collimated light source include a line-collimated laser and a line-collimated LED (or array of LEDs). Such a line-collimated light source may be useful, for example, for a machine vision embodiment wherein the optical structured energy sensor is a camera observing the projected line. When uncut material causes lifting of adjacent material near cut material, the apparent location of a segment of the projected line can be displaced vertically. Such vertical displacement of the segment of the projected line can be observed by the camera of a machine vision subsystem to detect the uncut material. Depending on the thickness of the cut material and the resolution of the optical structured energy sensor, the lifting of the cut material and the lack of lifting of adjacent material can be confirmed by camera observation of a corresponding slight vertical displacement of a segment of the projected line where the cut material was before it was lifted. A difference in magnitude of the vertical displacement resulting from uncut material and the slight vertical displacement resulting from the cut material makes it easy to distinguish the occurrences of these different phenomena. Other examples of an optical structured energy sensor, besides a camera as described above, are a phototransistor, a photodiode, a photovoltaic cell, a photosensitive cell, and arrays of the foregoing or combinations thereof.

Figure 14:
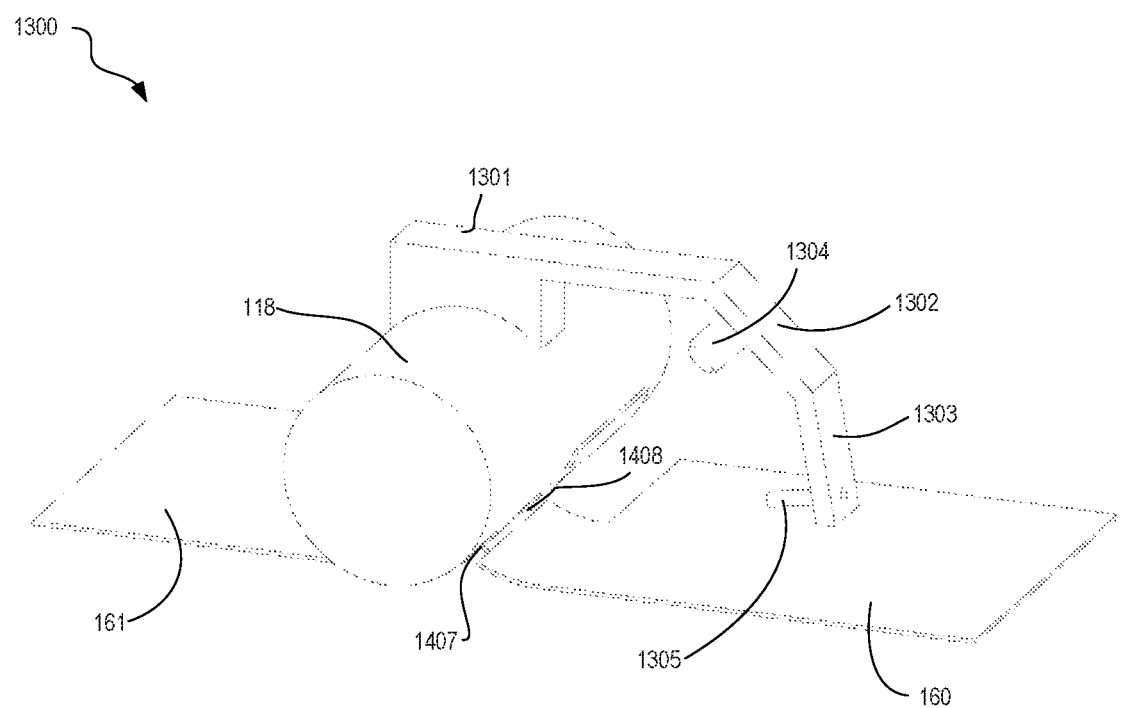
FIG. 14 is a perspective view diagram illustrating an apparatus for uncut material detection in accordance with at least one embodiment.

FIG. 14 is a perspective view diagram illustrating an apparatus for uncut material detection in accordance with at least one embodiment. Apparatus 1300 remains the same as in FIG. 13. However, instead of an unbridged gap, as shown by gap 1306 in FIG. 13, uncut material portion 1407 and uncut material portion 1408 bridge the gap between select workpiece 161 and flexible sheet 160. Such an uncut material portion links an edge of select workpiece 161 being lifted onto cylinder 118 to an adjacent edge of the peripheral portion of flexible sheet 160. As select workpiece 161 is being lifted, the linkage formed by the uncut material portion also lifts the adjacent edge of the peripheral portion of flexible sheet 160. Such unintended lifting can cause damage to select workpiece 161 or to flexible sheet 160 or can interfere with the operation of cylinder 118 or other parts of the apparatus.

To avoid harmful effects resulting from an uncut material portion, the uncut material detector instantiated in the apparatus 1300 for uncut material detection detects the lifting of the peripheral portion of flexible sheet 160 and stops the lifting process before damage can occur.

Figure 15:
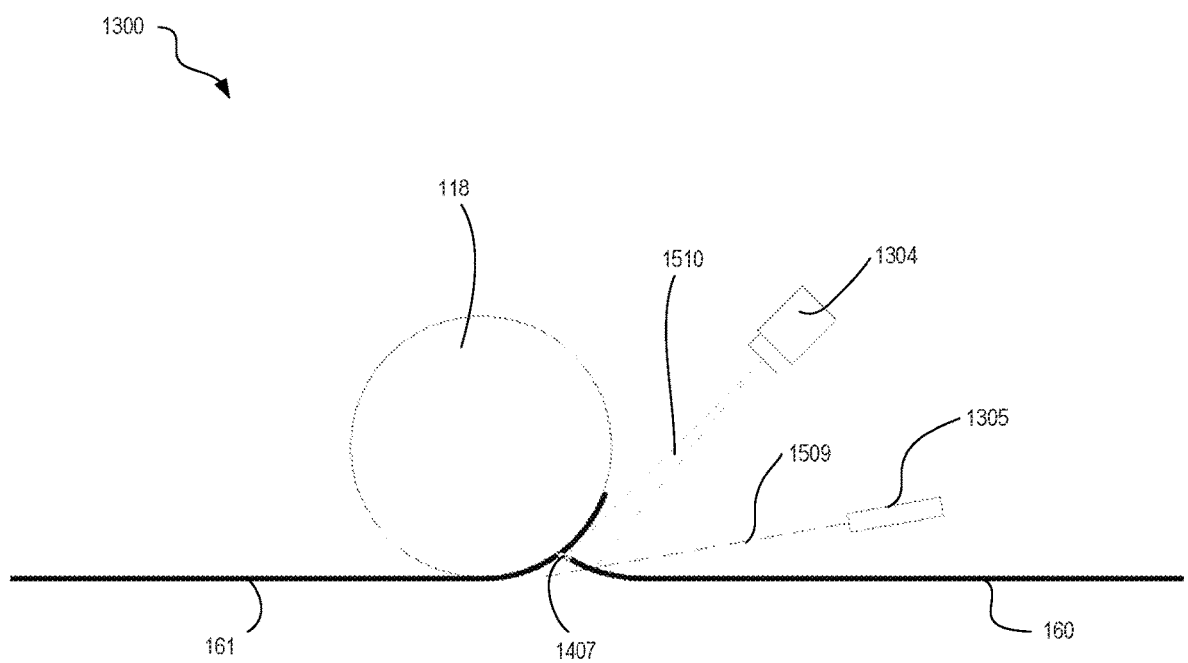
FIG. 15 is a side elevation view diagram illustrating an apparatus for uncut material detection in accordance with at least one embodiment.

FIG. 15 is a side elevation view diagram illustrating an apparatus for uncut material detection in accordance with at least one embodiment. Apparatus 1300 remains the same as in FIGS. 13 and 14. The paths of the structured energy to and from the lifted area of the peripheral portion of flexible sheet 160 are shown in FIG. 15. A source path 1509 extends from structured energy source 1305 to the lifted area of the peripheral portion of flexible sheet 160. A sensor path 1510 extends from the lifted area of the peripheral portion of flexible sheet 160 to structured energy sensor 1304. The lifting of the lifted area of the peripheral portion of flexible sheet 160 changes the location along flexible sheet 160 upon which the structured energy of structured energy source 1305 is incident. Structured energy sensor 1304 detects that change of location to detect the lifting of the lifted area of the peripheral portion of flexible sheet 160.

Figure 16:
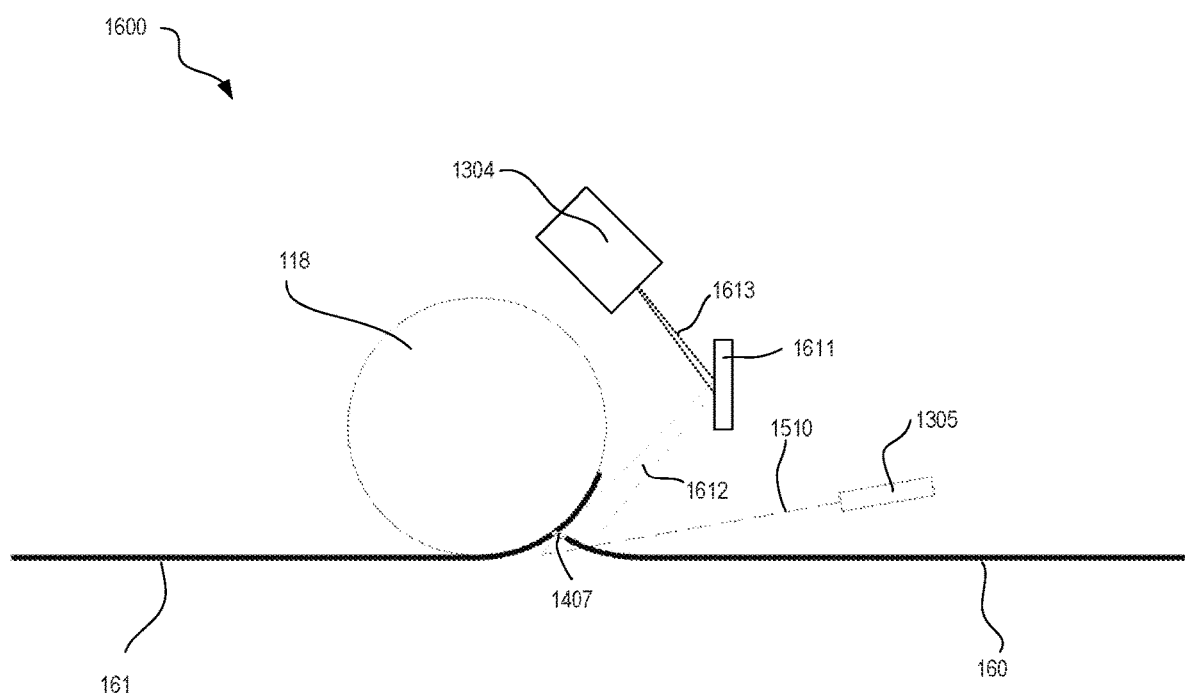
FIG. 16 is a side elevation view diagram illustrating an apparatus for uncut material detection further comprising a mirror in accordance with at least one embodiment.

FIG. 16 is a side elevation view diagram illustrating an apparatus for uncut material detection further comprising a mirror in accordance with at least one embodiment. Apparatus 1600 differs from apparatus 1300 by the inclusion of reflector 1611, which replaces sensor path 1510 with a first sensor path 1612 extending from the lifted area of the peripheral portion of flexible sheet 160 to reflector 1611 and a second sensor path 1613 extending from reflector 1611 to structured energy sensor 1304. As reflector 1611 reflects the incident structured energy, causing second sensor path 1613 to be oriented in a different direction than first sensor path 1612, structured energy sensor 1304 can be relocated from its position in apparatus 1300 to a different position along second sensor path 1613. Thus, for example, structured energy sensor 1304 can be located in a more protected area, such as in or near yoke frame 106 of FIG. 1. In addition to or as an alternative to reflector 1611, a reflector may be placed between structured energy source 1305 and the lifted area of the peripheral portion of flexible sheet 160. Such a reflector may allow relocation of structured energy source 1305 from its location in FIGS. 13-16 to a different location. As an example, either or both reflectors may be mirrors, microwave reflectors, acoustic reflectors, or other types of reflectors capable of reflecting the type of structured energy being used.

Figure 17:
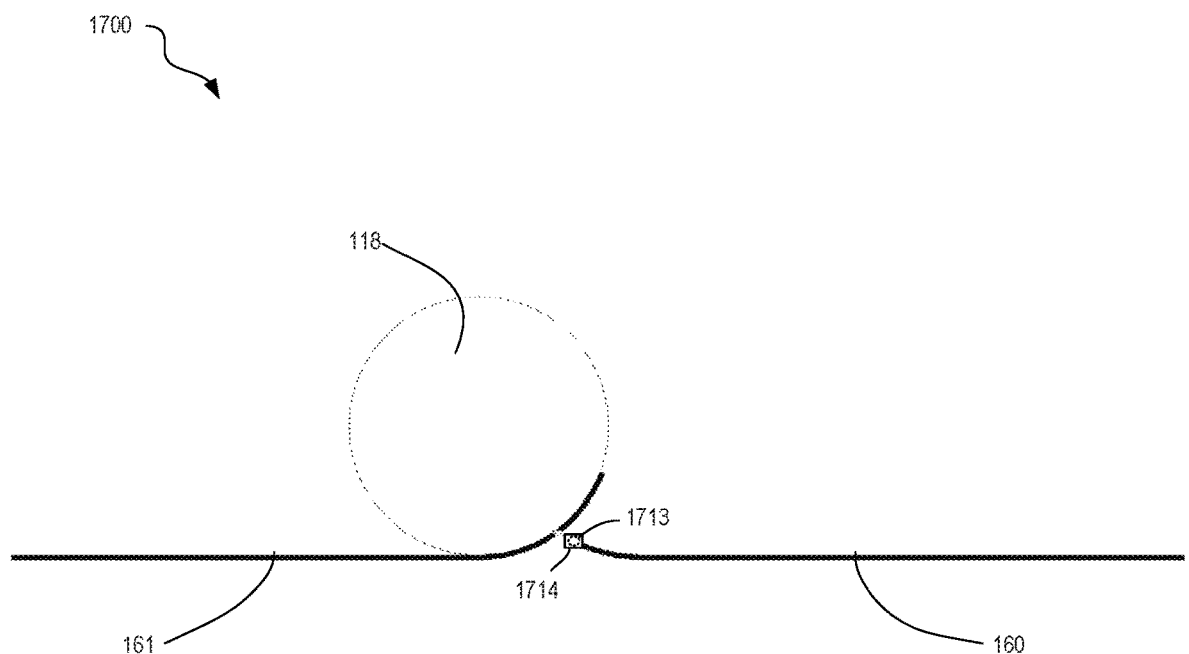
FIG. 17 is a side elevation view diagram illustrating an apparatus for uncut material detection using a through beam in accordance with at least one embodiment.

FIG. 17 is a side elevation view diagram illustrating an apparatus for uncut material detection using a through beam in accordance with at least one embodiment. Apparatus 1700 comprises a through-beam uncut material detector comprising a through-beam structured energy source 1713 and a through-beam structured energy sensor 1714. Through-beam structured energy source 1713 is illustrated with a broken line to indicate that it is located behind through-beam structured energy sensor 1714. For example, through-beam structured energy source 1713 may be located near or beyond a first end of cylinder 118, and through-beam structured energy sensor 1714 may be located near or beyond a second end of cylinder 118. As an example, a through-beam of structured energy may be projected by through-beam structured energy source 1713 to through-beam structured energy sensor 1714 along a line parallel to an axis of cylinder 118.

Figure 18:
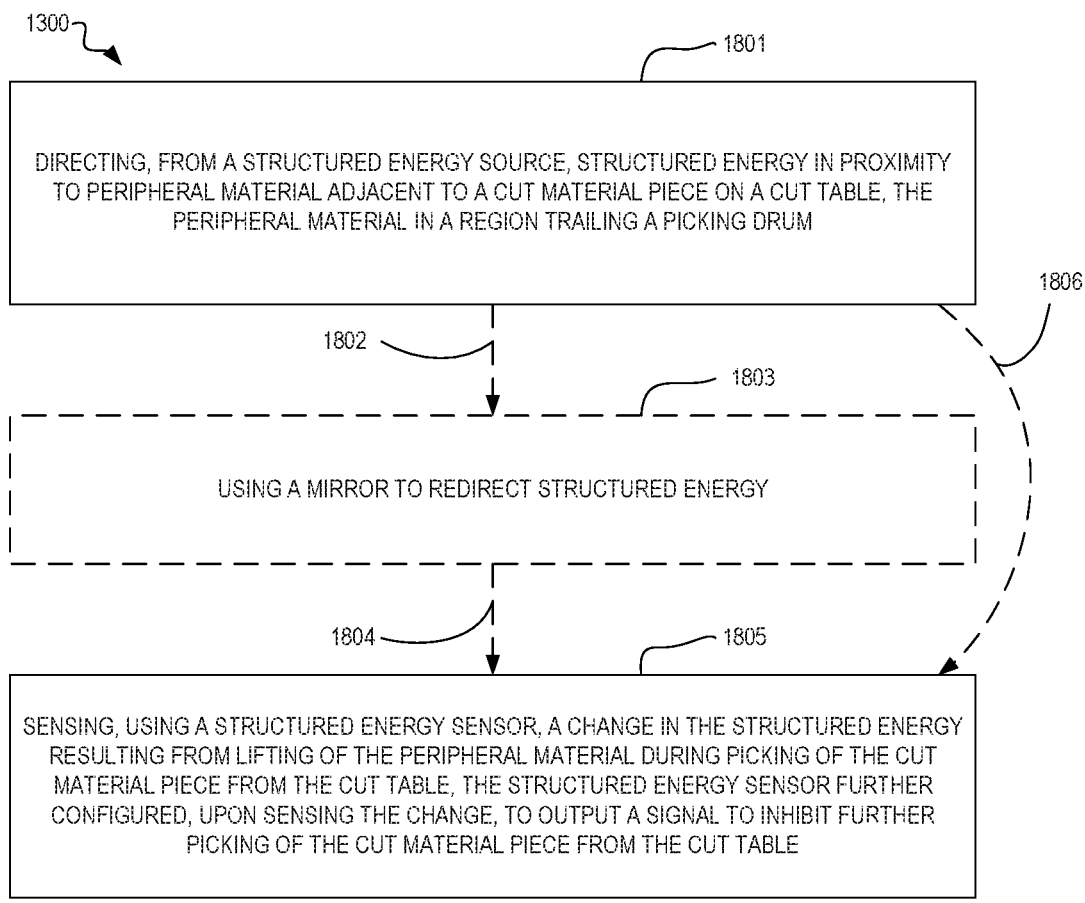
FIG. 18 is a flow diagram illustrating a method for uncut material detection in accordance with at least one embodiment.

FIG. 18 is a flow diagram illustrating a method for uncut material detection in accordance with at least one embodiment. Method 1800 begins at block 1801. At block 1801, structured energy is directed in proximity to peripheral material adjacent to a cut material piece on a cut table from a structured energy source. The peripheral material is in a region trailing a picking drum, such as cylinder 118. From block 1801, one embodiment of method 1800 can continue to block 1803 via path 1802. In block 1803, a reflector is used to redirect the structured energy. From block 1803, such an embodiment of method 1800 continues along path 1804 to block 1805. Alternatively, another embodiment of method 1800 continues from block 1801 to block 1805 along path 1806, omitting block 1803. At block 1805, a structured energy sensor is used to sense a change in the structured energy resulting from lifting of the peripheral material during picking of the cut material piece from the cut table. The structured energy sensor is further configured, upon sensing the change, to output a signal to inhibit further picking of the cut material piece from the cut table.

Method 1800 can be performed by apparatus having a structured energy sensor. At least one embodiment can be performed by apparatus having both a structured energy source and a structured energy sensor. Such element or elements are configured in relation to a picking drum. The apparatus comprises a cut material picking inhibit output to provide a cut material picking inhibit signal to inhibit further picking of the cut material piece from the cut table. The cut material picking inhibit output is connected to the cut material picking apparatus to implement inhibiting of the further picking of the cut material. Such inhibition capability provides a technological improvement over a cut material picking system that is unable detect and stop the cut material picking if the cut material remains attached to adjacent material by uncut material that should have been cut to separate the cut material from the adjacent material. A benefit of the technological improvement is that damage to material resulting from tensile force of the picking process transmitted through uncut material at an intended boundary of the cut material can be avoided, thereby improving production yield and avoiding waste of material that would have otherwise resulted had the damage been allowed to occur.

Figure 19:
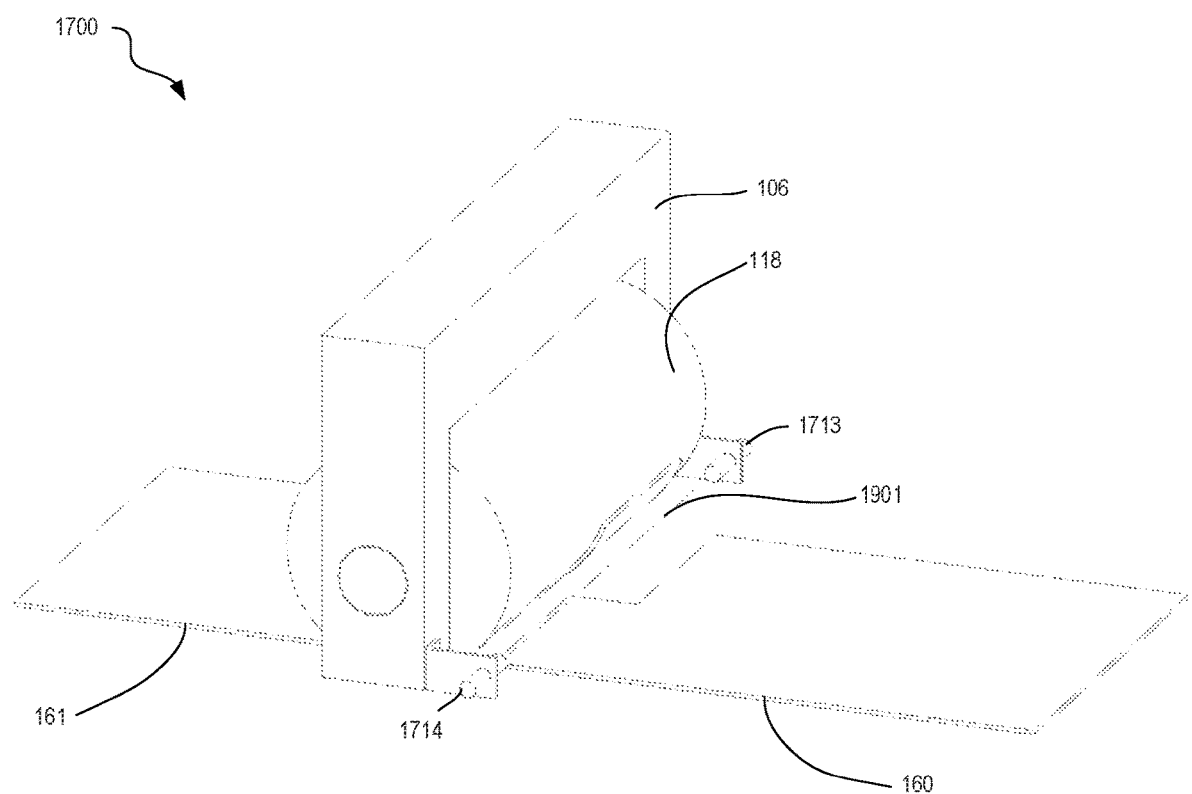
FIG. 19 is a perspective view diagram illustrating an apparatus for uncut material detection using a through beam during processing of a fully cut material piece in accordance with at least one embodiment.

FIG. 19 is a perspective view diagram illustrating an apparatus for uncut material detection using a through beam during processing of a fully cut material piece in accordance with at least one embodiment. As in FIG. 17, Apparatus 1700 comprises a through-beam uncut material detector comprising a through-beam structured energy source 1713 and a through-beam structured energy sensor 1714. Through-beam structured energy source 1713 is illustrated as being located near or beyond a first end of cylinder 118, and through-beam structured energy sensor 1714 is illustrated as being located near or beyond a second end of cylinder 118. As an example, a through-beam 1901 of structured energy may be projected by through-beam structured energy source 1713 to through-beam structured energy sensor 1714 along a line parallel to an axis of cylinder 118 and near the surface of cylinder 118. As shown, flexible sheet 160 of material has been fully cut so that the portion on cylinder 118 is completely detached from the remainder of flexible sheet 160. Thus, the remainder of flexible sheet 160 is not lifted from the cutting table as the portion on cylinder 118 is lifted from the cutting table. Accordingly, through-beam 1901 passes from through-beam structured energy source 1713 to through-beam structured energy sensor 1714 over the remainder of flexible sheet 160 without being broken by a lifted portion of the remainder of flexible sheet 160.

Figure 20:
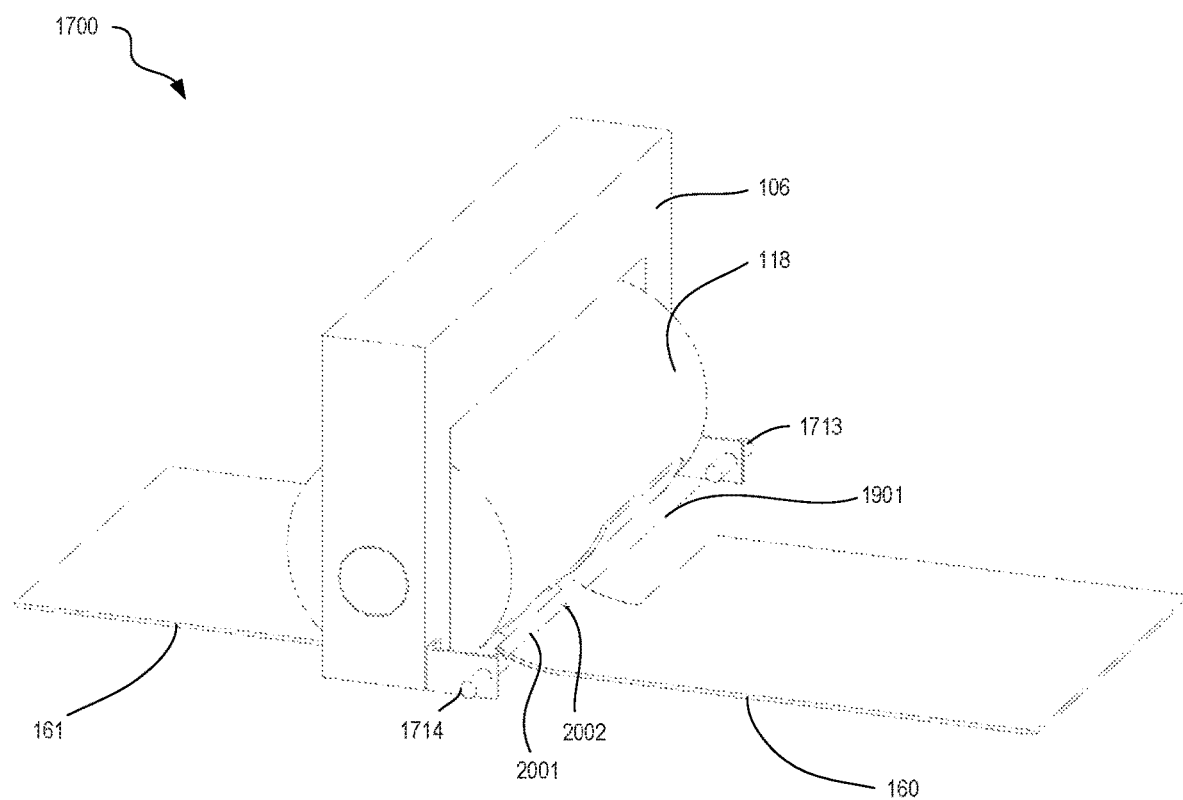
FIG. 20 is a perspective view diagram illustrating an apparatus for uncut material detection using a through beam during processing of a cut material piece having at least one uncut portion in accordance with at least one embodiment.

FIG. 20 is a perspective view diagram illustrating an apparatus for uncut material detection using a through beam during processing of a cut material piece having at least one uncut portion in accordance with at least one embodiment. FIG. 20 differs from FIG. 19 in that FIG. 20 shows flexible sheet 160 of material having not been fully cut but having at least one uncut portion connecting the portion on cylinder 118 to the remainder of flexible sheet 160. As the portion on cylinder 118 is lifted from the cutting table, the uncut portion connected to it pulls up on the remainder of flexible sheet 160, lifting it from the cutting table. As the remainder of flexible sheet 160 is lifted, it interrupts through beam 1901 at point 2002, such that the portion 2001 of through beam 1901 that would otherwise exist is not present to be detected by through-beam structured energy sensor 1714.

Figure 21:
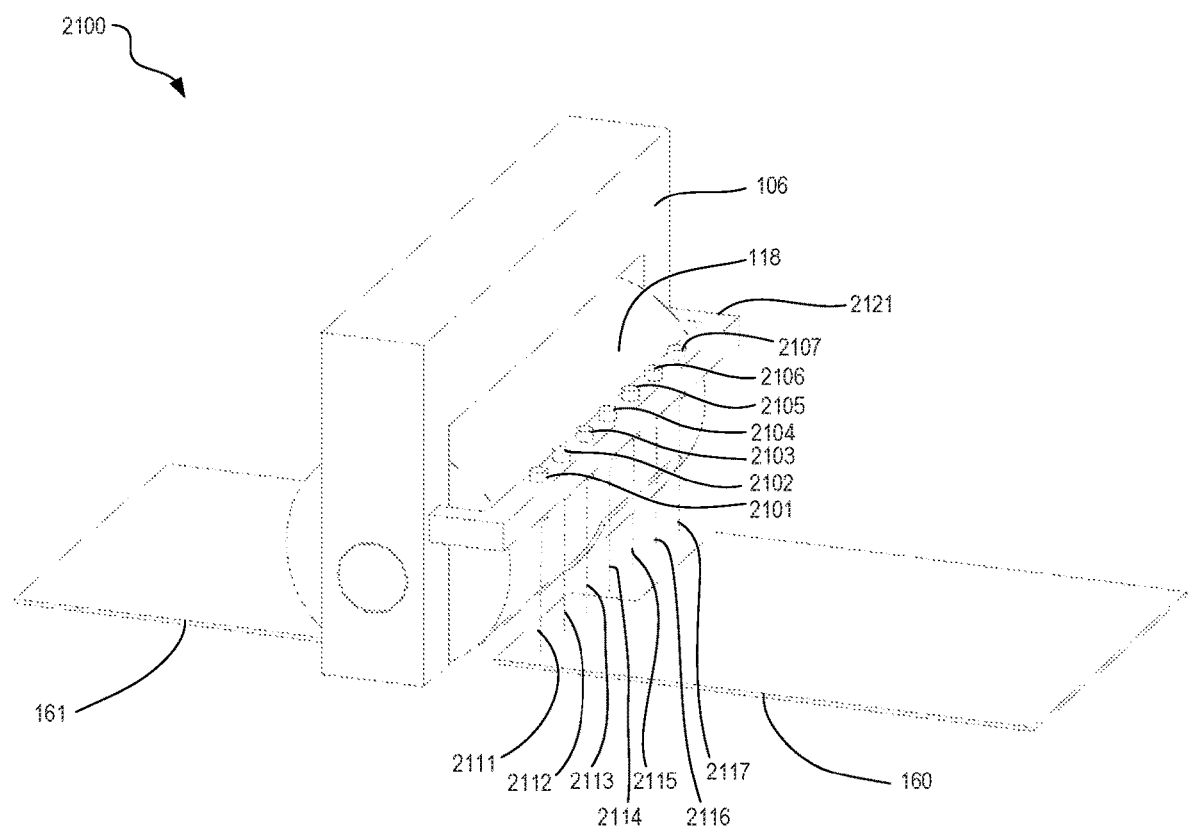
FIG. 21 is a perspective view diagram illustrating an apparatus for uncut material detection using proximity sensors during processing of a fully cut material piece in accordance with at least one embodiment.

FIG. 21 is a perspective view diagram illustrating an apparatus for uncut material detection using structured energy sensors during processing of a fully cut material piece in accordance with at least one embodiment. A plurality of structured energy sensors, illustrated as structured energy sensors 2101, 2102, 2103, 2104, 2105, 2106, and 2107, are mounted in frame 2121, which is attached to yoke 106. Structured energy sensors 2101, 2102, 2103, 2104, 2105, 2106, and 2107 are directed downward toward flexible sheet 160, being responsive to structured energy received along paths 2111, 2112, 2113, 2114, 2115, 2116, and 2117, respectively. The structured energy can be provided, for example, by using structured energy sensors 2101, 2102, 2103, 2104, 2105, 2106, and 2107 as their own structured energy sources (e.g., in the case of a transducer capable of converting energy between electrical energy and another form of energy in either direction), by using structured energy sources co-located with structured energy sensors 2101, 2102, 2103, 2104, 2105, 2106, and 2107, or, for example, by using one or more other sources. With flexible sheet 160 remaining flat, the paths 2111, 2112, 2113, 2114, 2115, 2116, and 2117 remain substantially equal to each other and represent the flat state of flexible sheet 160. As shown, paths 2111, 2112, 2113, 2114, 2115, 2116, and 2117 can be parallel to each other and parallel to a line tangential to the surface of cylinder 118. Paths 2111, 2112, 2113, 2114, 2115, 2116, and 2117 can, for example, be perpendicular to a surface of flexible sheet 160.

Figure 22:
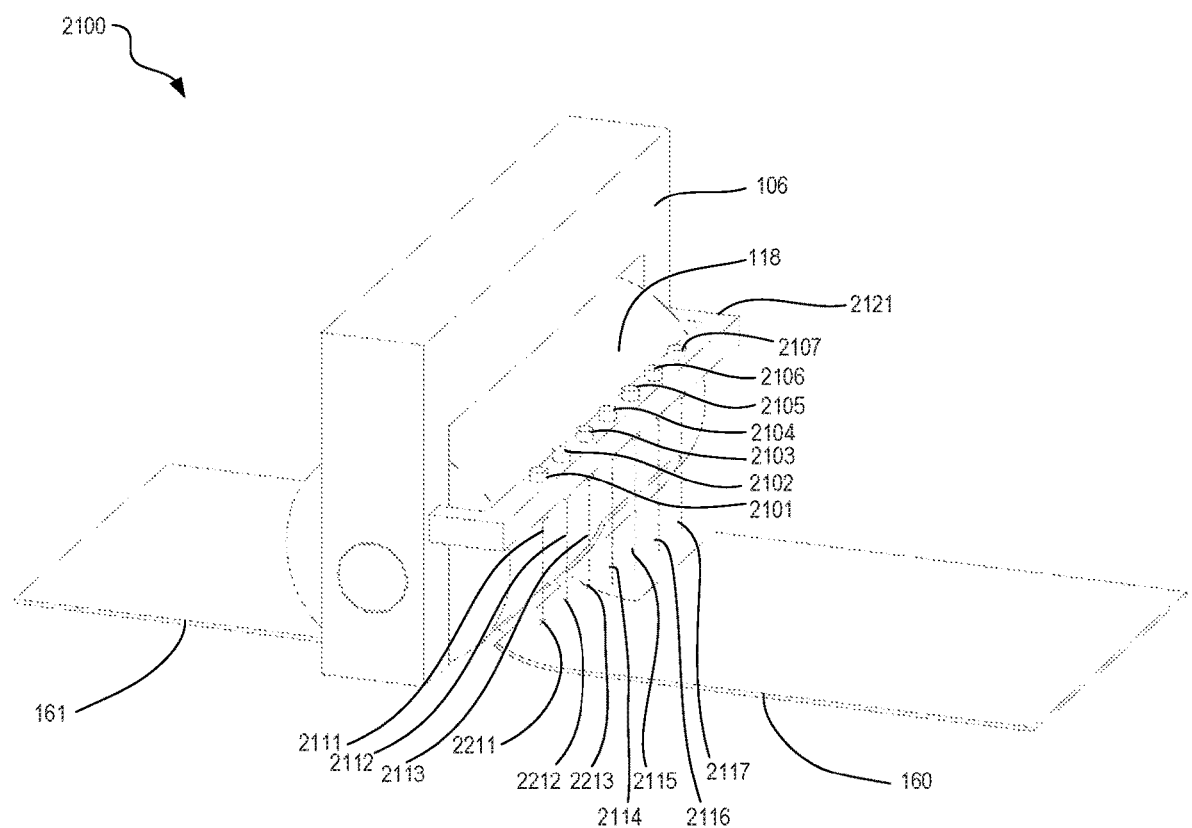
FIG. 22 is a perspective view diagram illustrating an apparatus for uncut material detection using proximity sensors during processing of a cut material piece having at least one uncut portion in accordance with at least one embodiment.

FIG. 22 is a perspective view diagram illustrating an apparatus for uncut material detection using proximity sensors during processing of a cut material piece having at least one uncut portion in accordance with at least one embodiment. FIG. 22 differs from FIG. 21 in that FIG. 22 shows flexible sheet 160 of material having not been fully cut but having at least one uncut portion connecting the portion on cylinder 118 to the remainder of flexible sheet 160. As the portion on cylinder 118 is lifted from the cutting table, the uncut portion connected to it pulls up on the remainder of flexible sheet 160, lifting it from the cutting table. As the remainder of flexible sheet 160 is lifted, it shortens the paths 2111, 2112, and 2113 relative to paths 2114, 2115, 2116, and 2117, and relative to the normal length of paths 2111, 2112, 2113 without the lifting. Paths 2111, 2112, and 2113 are shortened to end at endpoints 2211, 2212, and 2113, respectively, by the lifting of the remainder of flexible sheet 160 as a result of the uncut portion of flexible sheet 160 pulling up on the remainder of flexible sheet 160 as the cut material piece is lifted and wrapped onto cylinder 118. Structured energy sensors 2101, 2102, 2103, 2104, 2105, 2106, and 2107 can thus be used to detect the presence of an uncut portion of flexible sheet 160. Upon detection, the process of lifting the cut material piece can be stopped to allow cutting of the uncut material, or the cutting of the uncut material may be performed automatically in response to the detection.

In a first aspect, an apparatus to remove a cut piece from a flexible sheet of material can include a pick head including a cylinder having a cylindrical surface that includes a first plurality of orifices, a plurality of vacuum chambers, and a vacuum actuator, each orifice of the first plurality of orifices is configured to be in communication with a corresponding one of the plurality of vacuum chambers and not in communication with any other one of the first plurality of orifices' corresponding vacuum chamber. The apparatus can further include a vacuum controller coupled to the vacuum actuator to enable a vacuum at a portion of the first plurality of orifices, and a rotation controller coupled to the pick head to move the cylindrical surface over the flexible sheet while a vacuum is maintained at the first portion of the orifices to wrap the first cut piece onto the cylindrical surface.

In one embodiment of the first aspect, the apparatus includes a separator rail configured to maintain a relative position to the cylinder as the cylinder rotates, the relative position of the separator rail being between a support surface upon which the flexible sheet resides and a portion of the first cut piece wrapped onto the cylindrical surface, and between a first peripheral portion of the flexible sheet that is adjacent the first cut piece and the cylindrical surface. In a more particular embodiment, the first aspect also includes, the separator rail is a roller. In another more particular embodiment, the first aspect also includes, a bottom portion of the separator rail is in contact with a portion of the flexible sheet while that is adjacent the first cut piece as the cylinder rotates to wrap the first cut piece onto the cylindrical surface. In an even more particular embodiment, the first aspect further includes the separator rail comprising a leading edge and a trailing edge, the leading edge being closer to a lower most lateral region of the cylinder surface than the trailing edge as the cut piece is wrapped onto the cylindrical surface. In still an even more particular embodiment, the first aspect includes the leading edge being the first cut piece, including the first peripheral portion, as the first cut piece is wrapped onto the cylindrical surface. In another still even more particular embodiment, the first aspect includes the cutting edge comprising a reciprocating edge.

In another embodiment of the first aspect, the cylindrical surface further includes a second plurality of orifices, each of which is configured to be in communication with a common vacuum chamber. In a more particular embodiment, the first aspect also includes a common vacuum controller coupled to the vacuum actuator to enable a vacuum at the common vacuum chamber independent of enabling a vacuum at the plurality of vacuum chambers.

In a further embodiment of the first aspect, a separator rail configured to maintain a relative position to a lower-most lateral edge of the cylinder as the cylinder rotates, the relative position of the separator rail being between a support surface upon which the flexible sheet resides and a portion of the first cut piece wrapped onto the cylindrical surface.

In a second aspect, a method can include moving a cylindrical surface of a pick head assembly over a leading edge of a first cut piece of a flexible sheet of material, enabling a vacuum at a first plurality of orifices that reside at the cylindrical surface, and removing the first cut piece from the flexible sheet of material by rolling the first cut piece onto the cylindrical surface.

In one embodiment of the second aspect, the method includes enabling the vacuum at the first plurality of orifices does not enable a vacuum at a second plurality of orifices that reside at the cylindrical surface. In another more particular embodiment of the first aspect, the method includes cutting residual pieces of the flexible sheet that connect the cut piece to an adjacent portion of the flexible sheet.

In another particular embodiment of the first aspect, a vacuum can be enabled at each one of the first plurality of orifices independent of each other one of the first plurality of orifices. In still another particular embodiment of the first aspect, enabling a common vacuum at each orifice of a second plurality of orifices that reside at the cylindrical surface.

In a third aspect, the apparatus can include a pick head comprising a cylindrical surface populated with a first plurality of orifices and a vacuum control device, each orifice of the first plurality is configured to be in communication with a corresponding discrete vacuum chamber, of a plurality of vacuum chambers, that is not in communication with any other orifice's corresponding discrete vacuum chamber, a surface to support a flexible sheet of material comprising a first cut piece that is surrounded by a first peripheral portion of the flexible sheet, and a position controller coupled to communicate with the pick head, and configured to position the pick head so that a first portion of the first plurality of orifices is over a leading edge of the first cut piece, and a second portion of the first plurality of orifices is over a portion of the flexible sheet adjacent the first cut piece. The apparatus further includes a discrete vacuum controller coupled to communicate with the vacuum control device to enable a vacuum, after the pick head has been placed over the leading edge, at each discrete vacuum chamber having corresponding orifice that belongs to the to the first portion of orifices, to positively engage the leading edge of the first cut piece with the cylindrical surface, and to disable a vacuum at each discrete vacuum chamber of having a corresponding orifice that belongs to the first portion of orifices to prevent the first portion of the flexible sheet from being engaged with the cylindrical surface, and a rotation controller coupled to the pick head to rotate the cylindrical surface over the sheet of material, after the vacuum is implemented on the first portion of the orifices, to wrap the first cut piece onto the cylindrical surface.

In a fourth aspect, an apparatus to remove a cut piece from a flexible sheet of material can include a pick head comprising a cylinder having cylindrical surface that includes a first plurality of orifices and a vacuum actuator, each orifice of the first plurality of orifices is configured to be in communication with a common vacuum chamber, a separator rail, a common vacuum controller coupled to the vacuum actuator to enable a vacuum at the plurality of orifices, and a rotation controller coupled to the pick head to rotate the cylindrical surface over the flexible sheet while a vacuum is maintained at the plurality orifices to wrap the first cut piece onto the cylindrical surface while the separator rail prevents wrapping peripheral portions of the flexible sheet that surround the cut piece onto the cylindrical surface.

In one embodiment of the fourth aspect, the separator rail is configured to be in contact with the flexible sheet while the first cut piece is being wrapped onto the cylindrical surface. In a more particular embodiment, the fourth aspect also includes, the separator rail comprises a leading edge and a trailing edge, the leading edge being a cutting edge that is closer to a lower most lateral region of the cylinder surface than the trailing edge as the rolling action controller wraps the cut piece onto the cylindrical surface, the cutting edge configured to cut a residual portion of the flexible sheet that connects the cut piece to the peripheral portion as the first cut piece is wrapped onto the cylindrical surface. In an even more particular embodiment, the fourth aspect further includes, the cutting edge being a sharp edge. In another even more particular embodiment, the fourth aspect further includes, the cutting edge comprises a reciprocating edge.

In another embodiment of the fourth aspect, the separator rail is a roller.

In a fifth aspect, an uncut material detector comprises a structured energy source configured to direct structured energy in proximity to peripheral material adjacent to a cut material piece on a cut table. The peripheral material is in a region trailing a picking drum. A structured energy sensor is configured to sense a change in the structured energy resulting from lifting of the peripheral material during picking of the cut material piece from the cut table. The structured energy sensor is further configured, upon sensing the change, to output a signal to inhibit further picking of the cut material piece from the cut table. In one embodiment of the fifth aspect, the structured energy source is configured to direct the structured energy onto a surface of the peripheral material. In a further embodiment of the fifth aspect, the structured energy source is configured to direct the structured energy above a surface of the peripheral material, where the table lies below the peripheral material. In another particular embodiment of the fifth aspect, the structured energy source is an optical structured energy source. In a further embodiment of the fifth aspect, the uncut material detector further comprises a mirror to redirect the structured energy. In a further embodiment of the fifth aspect, the mirror redirects a view of peripheral material by the structured energy sensor. In another embodiment of the fifth aspect, the structured energy sensor comprises a through-beam optical sensor utilizing a light beam oriented in a trailing position to a pick drum such that a lifting of the peripheral material blocks the light beam. In another particular embodiment of the fifth aspect, the structured energy source is an acoustic structured energy source. In a further embodiment of the fifth aspect, structured energy source is an ultrasonic structured energy source. In another particular aspect of the fifth aspect, the structured energy source is an electrostatic structured energy source.

In a sixth aspect, a method for detecting uncut material when picking a cut material piece from a cut table is provided. The method comprises directing, from a structured energy source, structured energy in proximity to peripheral material adjacent to a cut material piece on a cut table, the peripheral material in a region trailing a picking drum and sensing, using a structured energy sensor, a change in the structured energy resulting from lifting of the peripheral material during picking of the cut material piece from the cut table, the structured energy sensor further configured, upon sensing the change, to output a signal to inhibit further picking of the cut material piece from the cut table. In an embodiment of the sixth aspect, the structured energy source is configured to direct the structured energy onto a surface of the peripheral material. In a further embodiment of the sixth aspect, the structured energy source is configured to direct the structured energy above a surface of the peripheral material, where the table lies below the peripheral material. In another particular embodiment of the sixth aspect, the structured energy source is an optical structured energy source. In a further embodiment of the sixth aspect, the method further comprises using a mirror to redirect the structured energy. In a further embodiment of the sixth aspect, the mirror redirects a view of peripheral material by the structured energy sensor. In another embodiment of the sixth aspect, the structured energy sensor uses a through-beam optical sensor utilizing a light beam oriented in a trailing position to a pick drum such that a lifting of the peripheral material blocks the light beam. In another particular embodiment of the sixth aspect, the structured energy source is an acoustic structured energy source. In a further embodiment of the sixth aspect, the structured energy source is an ultrasonic structured energy source. In another particular embodiment of the sixth aspect, the structured energy source is an electrostatic structured energy source.

The concepts of the present disclosure have been described above with reference to specific embodiments. However, one of ordinary skill in the art will appreciate that various modifications and changes can be made without departing from the scope of the present disclosure as set forth in the claims below. In particular, the sizes and numbers of various parts relative to other parts may differ from those of the illustrated exemplary embodiments. Accordingly, the specification and figures are to be regarded in an illustrative rather than a restrictive sense, and all such modifications are intended to be included within the scope of the present disclosure.

For example, while positioning of the pick head assembly 140 relative to the table has been described as being accomplished by the positioner assembly 111 and by the rotator 114, in other embodiments, positioning can be accomplished by moving the table 150 relative the pick head, and by rotating the table 150 or the pick head 141. As another example, while the selectable orifices 117 have been illustrated as being configured as a single row of orifices, e.g., a 1×20 array, in other embodiments, the lateral region containing the selectable orifices can be an array including 2 or more rows. In an embodiment, each row can be offset from its adjacent rows so that orifices at adjacent rows are not aligned. The term cylinder as used herein is intended to refer to a structure having a curved surface that when viewed in cross-section is circular, elliptical, the like and combinations thereof. In another embodiment, it will be appreciated that while for ease of discussion it has been presumed a vacuum is enabled at each individually controllable orifice directly overlying the current workpiece, though this need not be the case, as in some circumstances it may only be necessary that a portion of the orifices of subset 502 need be enabled. Also, instead of using individually controlled orifices where there is a one-to-one correspondence, individually controlled sets of orifices can be used. For example, two orifices can be connected to a common individually controllable vacuum chamber to allow orifices to be enabled in pairs, or larger numbers. Also, while the present disclosure has generally described the cylinder 118 as being in contact with the flexible material 160, it will be appreciated that it need not actually touch, so long as the underlying flexible material is in communication with the orifice by being sufficiently close thereto to for the purposes described herein.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method for detecting uncut material when picking a cut material piece from a cut table, the method comprising:
    directing, from a structured energy source, structured energy in proximity to peripheral material adjacent to a cut material piece on a cut table, the peripheral material in a region trailing a picking drum configured to pick up the cut material piece from the cut table by rolling the cut material piece directly onto the picking drum; and
    sensing, using a structured energy sensor, a change in the structured energy resulting from lifting of the peripheral material during picking of the cut material piece from the cut table by the picking drum, the structured energy sensor further configured, upon sensing the change, to output a signal to inhibit further picking of the cut material piece from the cut table.

2. The method of claim 1 wherein the structured energy source is configured to direct the structured energy onto a surface of the peripheral material.

3. The method of claim 2 wherein the structured energy source is configured to direct the structured energy above a surface of the peripheral material, where the table lies below the peripheral material.

4. The method of claim 1 wherein the structured energy source is an optical structured energy source.

5. The method of claim 4 further comprising:
    using a mirror to redirect the structured energy.

6. The method of claim 5 wherein the mirror redirects a view of peripheral material by the structured energy sensor.

7. The method of claim 4 wherein the structured energy sensor uses a through-beam optical sensor utilizing a light beam oriented in a trailing position to the picking drum such that a lifting of the peripheral material blocks the light beam.

8. The method of claim 1 wherein the structured energy source is an acoustic structured energy source.

9. The method of claim 8 wherein the structured energy source is an ultrasonic structured energy source.

10. The method of claim 1 wherein the structured energy source is an electrostatic structured energy source.

11. An uncut material detector for detecting peripheral material when picking a cut material piece from a cut table, the uncut material detector comprising:
    a structured energy source configured to direct structured energy in proximity to the peripheral material adjacent to the cut material piece on the cut table, the peripheral material in a region trailing a picking drum configured to pick up the cut material piece from the cut table by rolling the cut material piece directly onto the picking drum; and
    a structured energy sensor configured to sense a change in the structured energy resulting from lifting of the peripheral material during picking of the cut material piece from the cut table by the picking drum, the structured energy sensor further configured, upon sensing the change, to output a signal to inhibit further picking of the cut material piece from the cut table.

12. The uncut material detector of claim 11 wherein the structured energy source is configured to direct the structured energy onto a surface of the peripheral material.

13. The uncut material detector of claim 12 wherein the structured energy source is configured to direct the structured energy above a surface of the peripheral material, where the table lies below the peripheral material.

14. The uncut material detector of claim 11 wherein the structured energy source is an optical structured energy source.

15. The uncut material detector of claim 14 further comprising a mirror to redirect the structured energy.

16. The uncut material detector of claim 15 wherein the mirror redirects a view of peripheral material by the structured energy sensor.

17. The uncut material detector of claim 14 wherein the structured energy sensor comprises:
    a through-beam optical sensor utilizing a light beam oriented in a trailing position to the picking drum such that a lifting of the peripheral material blocks the light beam.

18. The uncut material detector of claim 11 wherein the structured energy source is an acoustic structured energy source.

19. The uncut material detector of claim 18 wherein the structured energy source is an ultrasonic structured energy source.

20. The uncut material detector of claim 11 wherein the structured energy source is an electrostatic structured energy source.

* * * * *